US008570877B1

(12) United States Patent
Bayar et al.

(10) Patent No.: US 8,570,877 B1
(45) Date of Patent: Oct. 29, 2013

(54) PREPARING FOR PLANNED EVENTS IN COMPUTER NETWORKS

(75) Inventors: Roopa Bayar, San Jose, CA (US); Sanjiv Doshi, San Jose, CA (US); Pankaj Shukla, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 666 days.

(21) Appl. No.: 12/829,061

(22) Filed: Jul. 1, 2010

Related U.S. Application Data

(60) Provisional application No. 61/326,493, filed on Apr. 21, 2010.

(51) Int. Cl.
*H04L 12/24* (2006.01)

(52) U.S. Cl.
USPC ......... 370/241.1; 370/242; 370/252; 370/401

(58) Field of Classification Search
None
See application file for complete search history.

(56) References Cited

U.S. PATENT DOCUMENTS

| | | |
|---|---|---|
| 2006/0198315 A1 | 9/2006 | Sasagawa et al. |
| 2008/0016402 A1 | 1/2008 | Harel et al. |
| 2009/0109861 A1* | 4/2009 | Kini et al. ............. 370/242 |
| 2009/0180399 A1 | 7/2009 | Li et al. |
| 2009/0282291 A1* | 11/2009 | Fitzgerald et al. ......... 714/39 |
| 2010/0208595 A1* | 8/2010 | Zhao et al. ............. 370/242 |
| 2011/0128861 A1* | 6/2011 | Ding et al. ............. 370/241.1 |
| 2011/0141911 A1* | 6/2011 | Washam et al. .......... 370/241.1 |
| 2011/0222413 A1* | 9/2011 | Shukla et al. .......... 370/241.1 |

OTHER PUBLICATIONS

U.S. Appl. No. 12/396,138, by Roopa Bayar, filed Mar. 2, 2009.
"Ethernet Operations, Administration, and Maintenance," White Paper, Cisco Systems, Inc., Copyright 1992-2007, 15 pages.
"IEEE Standard for Local and Metropolitan Area Networks—Virtual Bridged Local Area Networks—Amendment 5: Connectivity Fault Management," LAN MAN Standards Committee, SiBeam Inc., Dec. 17, 2007, 260 pages.
"OSI Reference Model—The ISO Model of Architecture for Open Systems Interconnection," by Hubert Zimmerman, published in IEEE Transaction on Communications, vol. 28, No. 4, Apr. 1980, pp. 425-432.

* cited by examiner

*Primary Examiner* — Yemane Mesfin
*Assistant Examiner* — Duc Duong
(74) *Attorney, Agent, or Firm* — Shumaker & Sieffert, P.A.

(57) ABSTRACT

In general, techniques are described for preparing a computer network for planned events. A network device comprising a control unit and an interface implements these techniques. The control unit is configured to be a member a maintenance association that verifies connectivity a single service instance. The interface outputs a maintenance message to an additional network device to verify connectivity between the network device and the additional network device. The control unit receives an indication to initiate a planned event capable of disrupting the maintenance association. Prior to the control unit performing the planned event, the interface generates a modified maintenance message indicating that the planned event will be performed by the network device. The interface then transmits the modified outgoing maintenance message to the additional network device to direct the additional network device to avoid detecting the planned event as a connectivity fault.

47 Claims, 7 Drawing Sheets

PREPARING FOR PLANNED EVENTS IN COMPUTER NETWORKS

This application claims the benefit of U.S. Provisional Application No. 61/326,493, filed Apr. 21, 2010, which is hereby incorporated by reference in its entirety.

TECHNICAL FIELD

The invention relates to computer networks and, more particularly, detecting faults within computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically broadcasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is by utilization of Virtual Local Area Networks (VLANs). VLANs are a generic grouping mechanism for Ethernet packets that allow logical isolation of multiple L2 networks that share the same physical Ethernet ports.

To troubleshoot this L2 connectivity, a process referred to as Operations, Administration and Maintenance (OAM) generally provides the activities, tools, standards and other techniques that involve operating, administering and maintaining connectivity in the L2 computer network. One such OAM technique, referred to as Connectivity Fault Management (CFM), which is described in the Institute of Electrical and Electronics Engineers (IEEE) 802.1ag standard, entitled "IEEE Standard for Local and Metropolitan Area Networks—Virtual Bridged Local Area Networks—Amendment 5: Connectivity Fault Management," which is hereby incorporated by reference as if fully set forth in this disclosure, may include a number of proactive and diagnostic fault localization procedures. For example, a network device operating in accordance with CFM may proactively transmit connectivity check (CC) messages at a predetermined rate to other switches within a maintenance association. That is, CFM allows an administrator to define a maintenance association as a logical grouping of devices within a L2 network that are configured to monitor and verify the integrity of a single service instance. The device may be located within a single region of the network or may be geographically separate from each other. A service instance may, for example, represent a portion of a provider network that a given customer can access to query a status of services delivered for that customer, such as the VLAN service discussed above. The CC messages include an identification of the maintenance association and are sent by each of the devices to provide connectivity verification to the other network devices within that particular maintenance association. The network devices in the maintenance association create and maintain a connectivity database specifying the group network devices from which periodic CC messages are expected to be received. After establishing connectivity with the other network devices in the maintenance association, monitor receipt of CC messages from each of the devices. If a CC message is not received from one of the network devices identified in the connectivity database within a configured time, the other network devices in the group may identify a failure of the device from which the CC message was expected to be received. This failure is commonly referred to as a "connectivity failure."

In response to detecting a connectivity failure, the network devices of the maintenance association usually perform a number of reactive procedures to locate and then respond to the fault. For example, the network devices of the maintenance association may, in response to detecting the fault, issue loopback and link trace messages to locate the fault. Based on the location of the fault, the switches of the maintenance association may re-calculate paths based on the changed network topology or otherwise reconfigure the connectivity between the various network devices of the maintenance association so as to avoid the fault and restore connectivity between the network devices of the maintenance association. In some instances, restoring connectivity involves interface issues that require the network devices to bring down or otherwise disable the interfaces. As the rerouting of connectivity typically disrupts forwarding or delivery of services undergoing CFM monitoring, detection of a connectivity failure should only occur in response to faults that are unavoidable instead of false positive faults that could be avoided if properly managed by an administrator or other network operator through proper planning.

SUMMARY

In general, techniques are described that facilitate graceful handling of false positive connectivity faults that may arise when a network device is intentionally made temporarily unavailable during a planned event. A false positive connectivity fault may arise when, for example, a network device of a maintenance association performs an in-service software upgrade (ISSU) to upgrade, while operational or actively switching packets, its software in either the control or data plane of the network device. This ISSU event generally impacts connectivity as one or more interface cards or other components of the network device are generally required to be restarted to complete the ISSU. Restarting these interface cards or other components may temporarily halt or interrupt forwarding of connectivity fault messages between this network device and other members network devices of the same maintenance association. Yet, because these connectivity faults are planned events rather than unplanned network events, such as an abrupt failure of a network device in the maintenance association, the administrator may prefer that the loss of connectivity not be considered a true connectivity fault considering that the lack of connectivity resulting from a planned event is generally short and does not overly impact switching behavior of the network when compared to unplanned connectivity faults. Given that some planned events may only impact forwarding to a relatively small extent when compared to unplanned events, the techniques described herein allow the network devices to handle these planned events gracefully through a connectivity fault management message that instructs the member network devices of their corresponding maintenance association to avoid detecting the upcoming planned event as a true connectivity fault.

As a result of gracefully handling planned events in this manner, the techniques enable network devices to perform planned events, such as an ISSU event, without causing connectivity faults. By avoiding detection of planned events as connectivity faults, the network devices of the maintenance association need not perform the additional operations to locate and reconfigure the maintenance association to account for the connectivity fault and then detect connectivity again after completion of the planned event only to locate the resolution of the false positive connectivity fault and reconfigure the maintenance association to account for the resolution of the fault. These types of instances where network devices configure and then reconfigure themselves in a short amount of time are often referred to a "network flap." Consequently, the techniques gracefully handle detection of false positive connectivity faults, such as planned events including ISSU events, to avoid a network flap within a maintenance association, thereby potentially significantly decreasing resource utilization required to configure and then reconfigure forward topology to account for detection and then resolution of the false positive connectivity fault.

In one embodiment, a method comprises configuring a first network device to be a member a maintenance association, wherein the maintenance association comprises a logical grouping of at least the first network device and a second network device that is established to verify the integrity of a single service instance and outputting an outgoing maintenance message with the first network device to the second network device to verify connectivity between the first and second network devices. The method also comprises receiving an indication to initiate a planned event with the first network device and prior to performing the planned event within the first network device capable of disrupting the maintenance association, generating a modified outgoing maintenance message with the first network device that indicates connectivity and includes an indicator that the planned event will be performed by the first network device. The method further comprises transmitting, with the first network device, the modified outgoing maintenance message to the second network device to direct the second network device to avoid detecting the planned event as a connectivity fault and, after transmitting the modified outgoing maintenance message, performing the planned event within the first network device.

In another embodiment, a network device comprises a control unit that includes a maintenance endpoint (MEP) module configured to be a member a maintenance association, wherein the maintenance association comprises a logical grouping of at least the network device and an additional network device that is established to verify the integrity of a single service instance and at least one interface including a distributed MEP module that outputs an outgoing maintenance message to the additional network device to verify connectivity between the network device and the additional network device. The control unit receives an indication to initiate a planned event capable of disrupting the maintenance association. The distributed MEP module, prior to the control unit performing the planned event capable of disrupting the maintenance association, generates a modified outgoing maintenance message that indicates connectivity and includes an indicator that the planned event will be performed by the network device and transmits the modified outgoing maintenance message to the additional network device to direct the additional network device to avoid detecting the planned event as a connectivity fault. The control unit, after transmitting the modified outgoing maintenance message, performs the planned event within the network device.

In another embodiment, a non-transitory computer-readable medium comprises instructions that cause a processor to configure a first network device to be a member a maintenance association, wherein the maintenance association comprises a logical grouping of at least the first network device and a second network device that is established to verify the integrity of a single service instance, output an outgoing maintenance message with the first network device to the second network device to verify connectivity between the first and second network devices, receive an indication to initiate a planned event with the first network device, prior to performing the planned event within the first network device capable of disrupting the maintenance association, generate a modified outgoing maintenance message with the first network device that indicates connectivity and includes an indicator that the planned event will be performed by the first network device, transmit, with the first network device, the modified outgoing maintenance message to the second network device to direct the second network device to avoid detecting the planned event as a connectivity fault, and after transmitting the modified outgoing maintenance message, perform the planned event within the first network device.

In another embodiment, a method comprises configuring a first network device to be a member of a maintenance association, wherein the maintenance association comprises a logical grouping of at least the first network device and a second network device that is established to verify connectivity of a single service instance, prior to the second network device performing a planned event capable of disrupting the maintenance association, receiving a modified incoming maintenance message from the second network device with the first network device, wherein the modified incoming maintenance message indicates connectivity and includes an indicator that the planned event will be performed by the second network device and updating, with the first network device, a loss threshold value in response to the indicator in the modified incoming maintenance message so that the first network device avoids detecting the planned event as a connectivity fault, wherein the loss threshold value indicates a period of time during which the first network device waits to receive a successive incoming maintenance message before detecting the connectivity fault.

In another embodiment, a network device comprises a control unit that includes a maintenance endpoint (MEP) module configured to be a member of a maintenance association, wherein the maintenance association comprises a logical grouping of at least the network device and an additional network device that is established to verify connectivity of a single service instance and at least one interface that includes a distributed MEP module that, prior to the additional network device performing a planned event capable of disrupting the maintenance session, receives a modified incoming maintenance message from the additional network device, wherein the modified incoming maintenance message indicates connectivity and includes an indicator that the planned event will be performed by the additional network device. The MEP module of the control unit updates a loss threshold value in response to the indicator in the modified incoming maintenance message so that the network device avoids detecting the planned event as a connectivity fault, wherein the loss threshold value indicates a period of time during which the network device waits to receive a successive incoming maintenance message before detecting the connectivity fault.

In another embodiment, A non-transitory computer-readable storage medium comprises instructions that cause a processor to configure a first network device to be a member of a maintenance association, wherein the maintenance association comprises a logical grouping of at least the first network device and a second network device that is established to verify connectivity of a single service instance, prior to the second network device performing a planned event capable of disrupting the maintenance association, receive a modified incoming maintenance message from the second network device with the first network device, wherein the modified incoming maintenance message indicates connectivity and includes an indicator that the planned event will be performed by the second network device and update, with the first network device, a loss threshold value in response to the indicator in the modified incoming maintenance message so that the first network device avoids detecting the planned event as a connectivity fault, wherein the loss threshold value indicates a period of time during which the first network device waits to receive a successive incoming maintenance message before detecting the connectivity fault.

In another embodiment, a method comprises receiving, with an intermediate network device positioned between first and second network devices, an outgoing maintenance message from the first network device, wherein the outgoing maintenance message is sent by the first network device to the second network device to verify connectivity of a maintenance association, wherein the maintenance association comprises a logical grouping of at least the first and second network devices that is established to verify the integrity of a single service instance. The method also comprises, prior to performing a planned event within the intermediate network device capable of disrupting the maintenance association, updating, with the intermediate network device, the outgoing maintenance message to indicate that the intermediate network device will perform the planned event and forwarding, with the intermediate network device, the updated outgoing maintenance message to the second network device to inform the second network device that the intermediate network device is going to perform the planned event.

In another embodiment, an intermediate network device positioned between first and second network devices, the intermediate network device comprises at least one interface that receives an outgoing maintenance message from the first network device, wherein the outgoing maintenance message is sent by the first network device to the second network device to verify connectivity of a maintenance association, wherein the maintenance association comprises a logical grouping of at least the first and second network devices that is established to verify the integrity of a single service instance, and a control unit that receives data initiating a planned event capable of disrupting the maintenance association. The at least one interface, prior to the control unit performing the planned event, updating, updates the outgoing maintenance message to indicate that the intermediate network device will perform the planned event and forwards the updated outgoing maintenance message to the second network device to inform the second network device that the intermediate network device is going to perform the planned event.

In another embodiment, a non-transitory computer-readable storage medium comprises instructions that cause a processor to receive, with an intermediate network device positioned between first and second network devices, an outgoing maintenance message from the first network device, wherein the outgoing maintenance message is sent by the first network device to the second network device to verify connectivity of a maintenance association, wherein the maintenance association comprises a logical grouping of at least the first and second network devices that is established to verify the integrity of a single service instance, prior to performing a planned event within the intermediate network device capable of disrupting the maintenance association, update, with the intermediate network device, the outgoing maintenance message to indicate that the intermediate network device will perform the planned event, and forward, with the intermediate network device, the updated outgoing maintenance message to the second network device to inform the second network device that the intermediate network device is going to perform the planned event.

The details of one or more aspects of the techniques are set forth in the accompanying drawings and the description below. Other features, objects, and advantages of the techniques of this disclosure will be apparent from the description and drawings, and from the claims.

DETAILED DESCRIPTION

Figure 1:
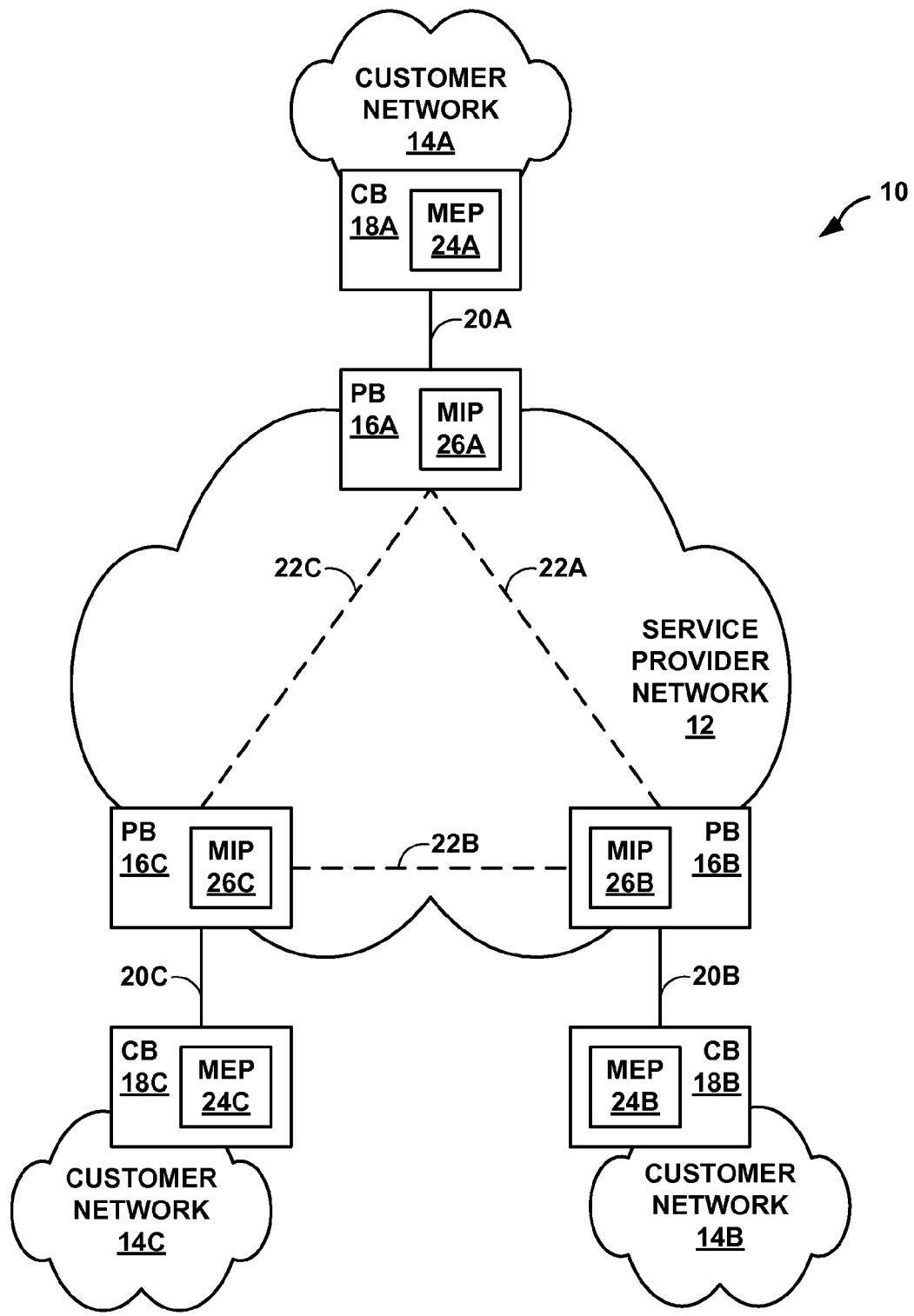
FIG. 1 is a block diagram illustrating a network system in which one or more network devices perform the techniques described in this disclosure to gracefully handle false positive connectivity faults.

FIG. 1 is a block diagram illustrating a network system 10 in which one or more network devices perform the techniques described in this disclosure to gracefully handle false positive connectivity faults. As shown in FIG. 1, network system 10 includes a network 12 and customer networks 14A-14C ("customer networks 14"). Network 12 may represent a public network that is owned and operated by a service provider to interconnect a plurality of edge networks, such as customer networks 14. As a result, network 12 may be referred to herein as a Service Provider (SP) network or, alternatively, as a "core network" considering that network 12 acts as a core to interconnects edge networks, such as customer networks 14. Exemplary service providers include Verizon Communications Inc. or American Telephone & Telegraph (AT&T™) Company.

These service providers may lease portions of network 12 or provide services offering interconnection through network 12 to customer networks 14, which may lease the portions or purchase the services provided by network 12. For example, network 12 may offer a Virtual Private Large Area Network (LAN) Service (VPLS) to virtually interconnect various layer 2 or data link layer networks. Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubret Zimmermann, published in IEEE Transactions on Communications, vol. 28, no. 4, dated April 1980, which is hereby incorporated by reference as if fully set forth herein. VPLS may transparently interconnect these layer 2 networks, e.g., customer networks 14, to one another via service provider network 12. Network 12 may provide VPLS by transparently emulating a direct connection between these various customer networks 14 such that, from the perspective of customer networks 14, each of customer networks 14 appears to directly connect to one another.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to purchase a service offered by service provider network 12, such as VPLS, in order to transparently interconnect these networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of customer networks 16 may comprise a Virtual Private Network (VPN), a Large Area Network (LAN), or a Wide Area Network (WAN). Although not shown in FIG. 1 for ease of illustration purposes, each of customer networks 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 12 may include a plurality of provider bridges (PB) 16A-16C ("PBs 16") that reside at an edge of service provider network 12. While discussed herein with respect to a particular network device, i.e., a bridge, PBs 16 may each represent any network device that interfaces with a network, such as one of customer networks 14, to route, switch or otherwise forward network traffic directed to or originating from the network. For example, PBs 16 may each represent, in certain instances, one or more of a switch, a hub, a bridge device (e.g., an Ethernet bridge), or any other L2 network device and, in some instances, L3 network devices capable of performing L2 functionality.

Each of customer networks 14 may also include a respective one of a plurality of customer bridges (CB) 18A-18C ("CBs 18") that reside at an edge of the corresponding one of customer networks 14. Like PBs 16, CBs 18, while discussed herein with respect to a particular network device, i.e., a bridge, may each represent any network device that interfaces with a network, such as service provider network 12, to route, switch or otherwise forward network traffic directed to or originating from the network. For example, CBs 18 may each represent, in certain instances, one or more of a switch, a hub, a bridge device (e.g., an Ethernet bridge), or any other L2 network device and, in some instances, L3 network devices capable of performing L2 functionality.

PBs 16 may couple to a respective one of CBs 18 via network links 20A-20C ("links 20"). PBs 16 may provide one or more services, such as the above described VPLS, to transparently interconnect CBs 18 to one another. To continue the above example, the large entity may own and operate each of customer networks 14 and purchase from the service provider a VPLS or other service, such as a Virtual Private Network (VPN) service, to transparently interconnect each of these customer networks 14 to one another via service provider network 12. In this instance, PB 16A may emulate a direct connection in accordance with the purchased service to both of customer networks 14B, 14C such that CB 18A may operate as if it directly connects to both CB 18B and CB 18C. Likewise, PB 16B may emulate a direct connection in accordance with the purchased service to both of customer networks 14A, 14C such that CB 18B may operate as if it directly connects to both CB 18A and CB 18C. Additionally, PB 16C may emulate a direct connection in accordance with the purchased service to both of customer networks 14A, 14B such that CB 18C may operate as if it directly connects to both CB 18A and CB 18B.

This form of interconnection is referred to as "full mesh" in that each of a set of customer networks 14 interconnect with every other one of the set of customer networks 14. The full mesh form of interconnection is illustrated in FIG. 1 as three bi-directional virtual links 22A-22C ("virtual links 22") that couple PBs 16 to one another. Virtual links 22 are illustrated in FIG. 1 as dashed lines to reflect that these links 22 may not directly couple PBs 16 to one another, but may represent one or more physical links and intermediate network devices that form each of virtual links 22. While assumed for ease of illustration purposes to be configured in this full mesh manner, customer networks 14 may interconnect with one another via any other form of interconnection, and virtual links 22 may be bi-directional or unidirectional to suit any particular form of interconnection.

An administrator of service provider network 12 may configure the purchased service to establish virtual links 22, and once established, PBs 16 may begin emulating the direct connection between CBs 18 via virtual links 22. CBs 18 may receive network traffic from their respective customer networks 14 and forward this network traffic via respective physical links 20 to corresponding PBs 16. PBs 16 may then transparently forward the network traffic through service provider network 12 via virtual links 22 in accordance with the purchased service. PBs 16 may then deliver the network traffic to the other ones of CBs 18 via physical links 20, whereupon CBs 18 may forward the traffic to their respective customer networks 14. In this manner, a large entity may purchase a service from service provider network 12 to interconnect disparate and often geographically separate customer networks 14.

To facilitate maintenance of the interconnection of customer networks 14, one or more of PBs 16 and/or one or more of CBs 18 may implement Operations, Administration, and Maintenance (OAM) techniques, such as Connectivity Fault Management (CFM) as described in the Institute of Electrical and Electronics Engineers (IEEE) 802.1ag standard. CFM may generally enable discovery and verification of a path, through network devices and networks, taken by data units, e.g., frames or packets, addressed to and from specified network users, e.g., customer networks 14. Typically, CFM is directed to fault management within layer 2 networks, such as Ethernet networks otherwise referred to as Large Area Networks (LANs), and layer 2 services, such as VPLS. While described herein with respect to layer 2 networks and services and the layer 2-centric CFM, the techniques may be employed to facilitate simultaneous execution of sessions for maintenance and operation management for networks and services provided with respect to other layers of the OSI model.

CFM generally provides a set of protocols by which to perform fault management. One protocol of the CFM set of protocols may involve a periodic transmission of messages to determine, verify or otherwise check continuity between two endpoints and may be referred to as a "continuity check protocol." Another protocol of the CFM set of protocols may involve a user or operator driven protocol by which targeted messages may be sent to specific endpoints requesting a response. The targeted or specific endpoint, may upon receiving the request message, issue a response to the message, such that the request and response loops from the originator of the specific endpoint and back to the originator. This second protocol of the CFM set of protocols may be referred to, for this reason, as a "loopback protocol." More information regarding CFM in general and the CFM set of protocols, including the continuity check protocol and the loopback protocol, can be found in an Institute of Electrical and Electronics Engineers (IEEE) draft standard, titled "Virtual Bridged Local Area Networks—Amendment 5: Connectivity Fault Management," by the LAN MAN Standards Committee, dated Jun. 18, 2007, herein incorporated by reference in its entirety.

In accordance with CFM, one or more users or administrators of customer networks 14 may establish various abstractions useful for managing maintenance operations. For example, the administrators may establish a Maintenance Domain (MD) specifying those of CBs 18 that support CFM maintenance operations. In other words, the MD specifies the network or part of the network for which faults in connectivity may be managed. The administrator may, in establishing or defining the MD, assign a maintenance domain name to the MD, which represents a MD identifier that uniquely identifies a particular MD. It is assumed for purposes of illustration that the MD includes not only CBs 18 but also additional CBs not shown in FIG. 1.

The administrators may further sub-divide the MD into one or more Maintenance Associations (MA). An MA may is a logical grouping that generally comprises a set of those CBs included within the MD and established to verify the integrity of a single service instance. A service instance may, for example, represent a portion, e.g., network devices, of a provider network that a given customer can access to query a status of services delivered for that customer. It is assumed for purposes of illustration that the administrators configured an MA to include each of CBs 18. To establish the MA, the administrators may configure a Maintenance association End Point (MEP) 24A-24C ("MEPs 24") within each one of CBs 18. While shown as including a single MEP 24, CBs 18 may include a plurality of MEPs 24, one for each of a plurality of service instances. MEPs 24 may each represent an actively managed CFM entity that generates and receives CMF Payload Data Units (PDUs) and tracks any responses. In other words, each of MEPs 24 represents an endpoint of the same MA.

The administrators may, when establishing the MA, define an MA IDentifier (MAID) and an MD level. The MA identifier may comprise an identifier that uniquely identifies the MA within the MD. The MA identifier may comprise two parts, the MD name assigned to the MD in which the MA resides and a MA name. The MD level may comprise an integer. In other words, the MD level may segment the MD into levels at which one or more MAs may reside. The administrators may then, when configuring MEPs 24, associate MEPs 24 to the MA by configuring each of MEPs 24 with the same MA identifier and the same MD level. In this respect, the MA identifier comprises the set of MEPs 24, each configured within the same MAID and MD level, established to verify the integrity of a single service instance.

Once configured in this manner, MEPs 24 may each detect both connectivity failures and unintended connectivity between service instances. Each of MEPs 24 may periodically transmit a Connectivity Check Message (CCM) announcing the identity and configured MD level of the transmitting one of MEPs 24. MEPs 24 may multicast this message to each of MEPs 24 included within the same MD level. Each of MEPs 24 may track the CCMs received from other MEPs 24 to determine connectivity faults and unintentional connectivity. For example, MEPs 24 may detect a connectivity fault by determining, based on received CCMs, a list of connected MEPs and comparing this list to a list of those MEPs within the same MD level. If the list of connected MEPs includes less MEPs than those expected or configured within each of MEPs 24, then MEPs 24 may determine that one or more of MEPs 24 lack a desired connectivity. This use of lists is one exemplary way of implementing connectivity checks, and the techniques of this disclosure should not be limited in this respect.

In other words, MEPs 24 may each be configured with one or more MEPs 24 with which it expects to exchange (or transmit and receive) CCM messages. MEPs 24 may then proceed to exchange CCM messages according to how each of MEPs 24 is configured. MEPs 24 may generate a list or otherwise track CCM messages after each exchange to determine those of MEPs 24 to which it is currently connected. If one of MEPs 24 did not receive an expected CCM message, for example, that one of MEPs 24 may generate a list lacking one of MEPs 24. Upon comparing this connectivity list to the expected list, this one of MEPs 24 may determine that one of MEPs 24 is not currently connected. In this manner, MEPs 24 may periodically determine whether each of MEPs 24 of the same MA are currently interconnected with one another, and thereby periodically evaluate connectivity.

As another example, MEPs 24 may detect a connectivity fault based on a loss of received CCMs. In some instances, each of MEPs 24 may maintain a threshold by which to determine whether a connectivity fault occurs. Each of MEPs 24 may maintain a single threshold or one threshold for each of the other MEPs 24. The threshold may be configurable by an administrator. In any case, MEPs 24 may monitor receipt of CCMs from each of the other ones of MEPs 24. MEPs 24 may determine a length or interval of time between receipt of successive CCMs from the same one of MEPs 24 and compare this interval to the threshold, if only one threshold is maintained, or the corresponding one of the plurality of thresholds, in instances where the MEP maintains a threshold for each MEP. If the interval exceeds the threshold, the one of MEPs 24 determines that one of MEPs 24 lack a desired connectivity. If the interval does not exceed the threshold, the one of MEPs 24 determines that the other one of MEPs 24 is connected.

In some instances, each of MEPs 24 may implement the plurality of thresholds as a timer that is continually reset upon receipt of a CCM from a respective one of MEPs 24. In these instances, each of MEPs 24 may reset the timer to the threshold value upon receipt of a CCM from a corresponding one of MEPs 24. The threshold value may be configurable by an administrator. If the timer reaches zero, the MEP may determined that a corresponding one of MEPs 24 lacks the desired connectivity. While a number of examples are described herein by which to determine a connectivity fault, the techniques of this disclosure should not be limited to any one of the above examples. Instead, the techniques described herein may be implemented by a network device to detect a fault in any manner.

MEPs 24 may execute the continuity check protocol to automatically, e.g., without any administrator or other user oversight after the initial configuration, exchange these CCM messages according to a configured or, in some instances, set period. MEPs 24 may, in other words, implement the continuity check protocol to perform fault detection. Upon detecting a lack of connectivity or connectivity fault, the administrator or other user, such as an Internet Technology (IT) specialist, may troubleshoot the fault using the above described loopback protocol.

Typically, the administrator performs this troubleshooting to verify and, once verified, isolate the fault, e.g., resolve where in the network the fault exists or occurred. To verify the fault, the administrator may interact with one of CBs 18 via a user interface (such as via Telnet or SSH) to cause the corresponding one of MEPs 24 to issue or transmit a unicast Loopback Message (LBM). The administrator may direct the one of MEPs 24 to issue the LBM to one of MEPs 24 or Maintenance domain Intermediate Points (MIPs) 26A-26C ("MIPs 26").

An administrator may configure, also in accordance with CFM, each of MIPs 26 within respective PBs 16. Each of MIPs 26 may represent a passive, rather than active, maintenance access point by which to query a status of and perform other maintenance operations with respect to PBs 16. MIPs 26 may, for example, receive LBMs and respond to LBM with a Loopback response or Reply message denoted by the acronym "LBR," but may not generate a LBM. Each of MIPs 26 may be configured by the administrator such that each of MIPs 26 is associated with a single MD and also with a single MD level. In this respect, the administrator may configure each of MIPs 26 to be grouped with particular MEPs, such as MEPs 24, forming a particular MA, such as the above assumed MA formed by MEPs 24. MIPs of different MA may then only respond to messages from MEPs that belong to the same MA. It is assumed herein for purposes of illustration that each of MIPs 26 is configured within the same MD level as MEPs 24.

To interact with one of MEPs 24 of a corresponding one of CBs 18, the administrator initiates a maintenance session by which to configure the LBM. The one of CBs 18 with which the administrator interacts is referred to as the local MEP, and the local MEP may execute this maintenance session by presenting a user interface, such as a Graphical User Interface, and/or a Command Line Interface (CLI), by which the administrator may interact with the corresponding one of MEPs 24. Via this maintenance session, the administrator may invoke the proper maintenance protocol (e.g., the CFM loopback protocol) to configure and generate LBMs, which the local MEP issues to other MEPs 24 or MIPs 26. For example, MEP 24B may detect it cannot connect to MEP 24A or in other words a connectivity fault with respect to MEP 24A in accordance with the continuity check protocol as described above. That is, MEP 24B may not receive a CCM from MEP 24A within a period of time and determine this connectivity fault. MEP 24B may issue an alert, warning or error indicating this fault to an administrator of customer network 14B. MEP 24B may present this alert, warning or error via a user interface, email, text message, website or other similar means of communication. The administrator may then log into CB 18B and initiate a maintenance session to interact with MEP 24B and further troubleshoot the connectivity to MEP 24A using the modified CFM loopback protocol as described herein.

In this example, the administrator may, via the maintenance session, configure one or more LBMs to resolve where in the network the fault exists, as the connectivity fault may, in the example network system 10 of FIG. 1, occur in link 20B, PB 16B, virtual link 22A, PB 16A, link 20A, and CB 18A. The administrator may configure by way of the maintenance session a LBM and cause MEP 24B to generate and forward this configured LBM to MIP 26B of PB 16B to verify both link 20B and PB 16B. Upon receiving an LBR back from PB 16B, the administrator may determine that both link 20B and PB 16B are not the source of the fault. The administrator may, in this manner, continue to configure LBMs and cause MEP 24B to generate and forward these LBMs to various MEPs 24 and MIPs 26 in order to resolve where in the network the fault exists.

In some instances, connectivity is interrupted not because of an unplanned event, such as a severed one of links 20, unrecoverable failure of any one or more of PBs 16 and/or CBs 18, but because of a planned event, such as an in-service software upgrade (ISSU) event. With respect to the example ISSU planned event, one of CBs 18, such as CB 18A, may receive input from an administrator initiating the ISSU planned event to upgrade software executed by CB 18A. This upgrade generally involves restarting various components of CB 18A, such as an interface, interface card, control unit or any other components that may be necessary to respond to CFMs from other CBs 18B, 18C and/or generate and forward CFMs to other CBs 18B, 18C. Even if the upgrade does not require these components to restart, the ISSU event may disable or otherwise disrupt operation by components that may be necessary to respond to CFMs from other CBs 18B, 18C and/or generate and forward CFMs to other CBs 18B, 18C. In any event, the ISSU planned event generally disrupts connectivity, thereby resulting in CBs 18B, 18C detecting this lack of connectivity as a connectivity fault.

In response to detecting this connectivity fault, CBs 18B, 18C then attempt to reestablish connectivity and failing that reconfigure themselves to account for the lack of connectivity between CBs 18B, 18C and CB 18A. Given that ISSU events, whether or not these ISSU planned events require a restart of components, generally require only a short amount of time to complete and therefore only minimally impact connectivity when compared to unplanned events, unrecoverable failure of any one or more of PBs 16 and/or CBs 18, CBs 18A generally resolves this connectivity fault in short order upon restarting or otherwise enabling these components to once again send and receive CFMs. In response to detecting the reestablishment of connectivity between CBs 18B, 18C and CB 18A, CBs 18B, 18C once again reconfigure themselves to account for the resolution of the connectivity fault. This configuration in response to detecting the connectivity fault caused by the ISSU planned event and then reconfiguration after detecting the resolution of the connectivity fault once the ISSU planned event has finished is generally referred to as a network flap.

Network flaps often needlessly consume network resources, such as processor cycles, memory, bandwidth (in term of sending messages to coordinate the configuration and reconfiguration) and any other network resource generally required by perform these operations.

In accordance with the techniques described in this disclosure, CBs 18, prior to performing a planned event capable of disrupting the maintenance association, generate an outgoing maintenance message that indicates that the planned event will be performed by the respective one of CBs 18. Referring to the example above, CB 18A, rather than simply perform the ISSU planned event in response to the administrators initiating input, generates an outgoing maintenance message that indicates that the ISSU planned event will be performed by CB 18A. CB 18A transmits this outgoing maintenance message to the remaining CBs 18, i.e., CBs 18B, 18C in this example, so that remaining CBs 18B, 18C avoid detecting the ISSU planned event as a connectivity fault. Considering that proper preparation by CBs 18B, 18C may avoid detecting this ISSU planned event as a connectivity fault, these planned events may represent false positive connectivity faults. The CFM protocol is generally considered a protocol for detecting unplanned events that disrupt connectivity, not planned events that disrupt connectivity for at least the reason that planned events may be accounted for when configuring CFM protocol. In this respect, detecting of planned events as connectivity faults should be considered as detecting a false positive connectivity fault.

Before the almost exponential growth in the size of networks and the number of devices that participate in networks, an administrator generally manually interfaced with each MEP 24 to configure these MEPs 24 to avoid detecting planned events. The administrator then initiated these planned events and manually interfaced with each of MEPs 24 again to reconfigure these MEPs 24 back to their original configuration. As networks have grown, however, the burden on administrators to manually configure and then reconfigure tens, hundreds, if not thousands of network devices that may be members of the same maintenance association has also grown significantly to the point where administrators may no longer manually perform this configuration and reconfiguration to avoid detecting planned events as connectivity faults.

In some instances described below in more detail, CB 18A generates the outgoing maintenance message such that it includes an optional field that instructs one or more of CBs 18B, 18C to set a loss threshold value to a sufficiently large value so that one or more of remaining CBs 18A, 18B avoids detecting the planned event as a connectivity fault. Each of CBs 18 normally store data defining a loss threshold value that designates a value for a timer that is used to detect connectivity faults. To illustrate, consider CB 18A that stores data defining a loss threshold value of 30 seconds, as one example. CB 18A receives a CCM (which again refers to a continuity check message) from CB 18B. Upon receiving this CCM, CB 18A resets a timer to the loss threshold value stored by CB 18A, whereupon the timer begins counting down from 30 seconds to zero seconds. Should the timer expire before CB 18A receives another CCM from CB 18B, CB 18A detects a connectivity fault between CB 18A and CB 18B. However, should CB 18A receive a CCM prior to the expiration of the timer, CB 18A resets the timer value again to the loss threshold value, continuing the above noted connectivity fault detection process. CB 18A generally maintains a timer for each of CBs 18B, 18C, or more generally for each member of any given maintenance association for which CB 18A is also a member. These timers may use different loss threshold values or the same loss threshold values.

Assuming CB 18A is about to undergo a planned event, such as an ISSU event, CB 18A generates an outgoing maintenance message to increase this loss threshold value for the timers included within CBs 18B, 18C such that CBs 18B, 18C reset their respective timers for monitoring connectivity faults between CBs 18B, 18C and CB 18A to the increased values specified by the outgoing maintenance message. CB 18A is effectively automatically configuring CBs 18B, 18C to account for the planned ISSU event, where the term "automatically" indicates that this action is performed without requiring direct administrative input to initiate this configuration.

Once the planned event is complete, CB 18A generates an outgoing maintenance message that does not include this optional field that instructs one or more of remaining CBs 18B, 18C to set the loss threshold value to a sufficiently large value, thereby effectively signaling that one or more of remaining CBs 18B, 18C should reset their timer to the previous value. In this sense, CB 18A effectively instructs one or more of remaining CBs 18B, 18C to utilize a temporary value when resetting continuity check timers until such time that CB 18A does not instruct them to use this temporary value. Consequently, CB 18A both automatically configures and reconfigures one or more of remaining CBs 18B, 18C. While described with respect to a particular signaling process that involves first the presence of the optional field in outgoing maintenance messages, such as CCMs, and then the lack of this optional field, the techniques may be implemented with respect to any signaling mechanism commonly employed to signal state changes in some amount of granular detail.

In some instances, CB 18A instructs only one of the remaining ones of CBs 18 to reset a given timer, which is possible considering the CFM protocol allows for adjacency-specific timers. Adjacency-specific timers, as noted above, are timers specified for timing CCM between a particular adjacency, where the term "adjacency" refers to two adjacent members of the same maintenance association. For example, CB 18A and 18B form a first adjacency, CB 18A and 18C may form a second adjacency, and CB 18B and 18C may form a third adjacency. CB 18A may maintain a first adjacency timer for the first adjacency and a second adjacency timer for the second adjacency. In these instances, CB 18B includes a first time for the first adjacency and a second timer for the third adjacency. CB 18C, in these instances, includes a first timer for the second adjacency and a second timer for the third adjacency. In any event, CB 18A may generate an outgoing maintenance message, such as a CCM, that includes the optional field for specifying an increased loss threshold value for only one of the first and second adjacencies, a subset of the adjacencies or all of the adjacencies. Consequently, the techniques may permit a level of granularity with respect to specifying which of the adjacency timers require the increased loss threshold value and which do not. Some adjacency timers may not need to be reconfigured, for example, if there loss threshold values exceed the loss threshold value specified in the outgoing maintenance message or if the ISSU will not impact certain interfaces. This level of granularity potentially enabled by the techniques of this disclosure may reduce needless configuration and reconfiguration of CBs 18 while also allowing the techniques to be adapted to certain network circumstances that do not permit such configuration and reconfiguration for certain CBs 18.

In other instances, CB 18A generates the outgoing maintenance message such that it includes a bit in a header field of the outgoing maintenance message set to indicate CB 18A is undergoing a planned event that may temporarily disrupt transmission of CCMs. This bit may represent a flag bit or other bit used to signal a current state of CB 18A. In some instances, an intermediate device positioned between CB 18A and either CB 18B or CB 18C, such as one or more of PBs 16, may intercept these outgoing maintenance messages and set this flag bit to indicate that it is about to or will perform a planned event. CBs 18 may receive this outgoing maintenance message with the flag bit set either by another one of CBs 18 or one of PBs 16 and, in response to determining that this flag bit is sent, prepare for the disruption of receipt and transmission of maintenance message. That is, CBs 18 may be configured to temporarily suspend detection of connectivity faults with respect to a given adjacency (i.e., a connection between CB 18A and one of remaining CBs 18B, 18C in this example) in response to receiving a maintenance message with this flag bit set. Consequently, the techniques may improve an accuracy with respect to detecting connectivity faults by avoiding false positive connectivity faults caused both by endpoint devices as well as intermediate devices.

Figure 2:
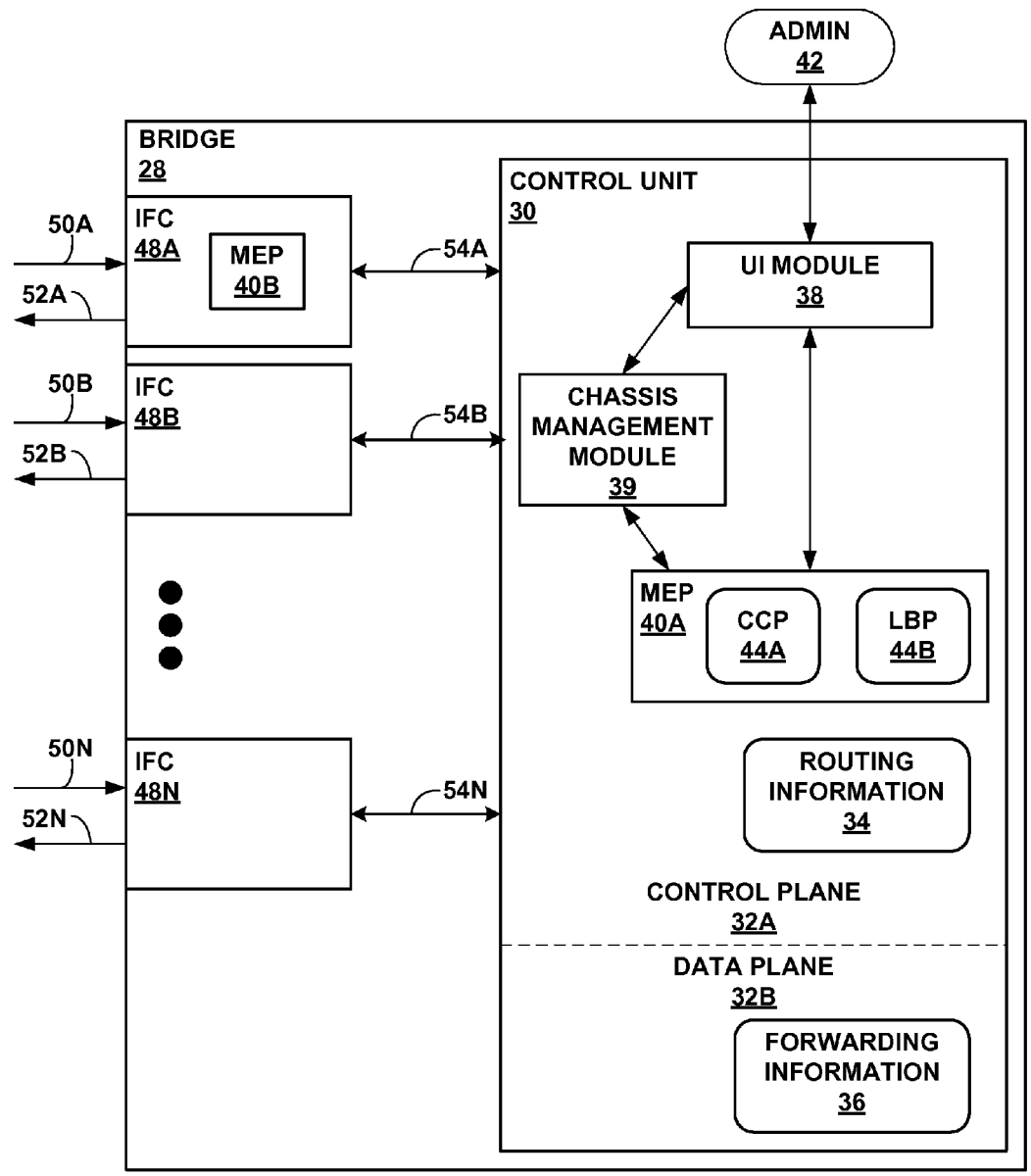
FIG. 2 is a block diagram illustrating an example embodiment of a bridge that implements the techniques described in this disclosure to automatically signal a planned event in a manner that avoids detecting false positive connectivity faults.

FIG. 2 is a block diagram illustrating an example embodiment of a bridge 28 that implements the techniques described in this disclosure to automatically signal a planned event in a manner that avoids detecting false positive connectivity faults. For purposes of illustration, bridge 28 may be described below within the context of exemplary network system 10 of FIG. 1 and may represent any one of CB 18. While described within this particular context, bridge 28 may also represent any one of PBs 16. Moreover, while described with respect to a particular network device, e.g., a bridge, the techniques may be implemented by any network device including an Ethernet bridge, a switch, a hub or any other device by which an administrator may initiate a planned event, such as an ISSU event. The techniques should therefore not be limited to the exemplary embodiments described in this disclosure.

As shown in FIG. 2, bridge 28 includes a control unit 30. Control unit 30 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 30 may be divided into two logical or physical "planes" to include a first control or routing plane 32A and a second data or forwarding plane 32B. That is, control unit 30 may implement two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 32A of control unit 30 may execute the routing functionality of bridge 28. In this respect, control plane 32A may represent hardware or a combination of hardware and software of control unit 30 that implements routing protocols (not shown in FIG. 2) by which routing information 34 may be determined. Routing information 34 may include information defining a topology of a network, such as one of customer networks 14. Control plane 32A may resolve the topology defined by routing information 34 to select or determine one or more routes through a corresponding one of customer networks 14. Control plane 32A may then update data plane 32B with these routes, where data plane 32B maintains these routes as forwarding information 36. Forwarding or data plane 32B may represent hardware or a combination of hardware and software of control unit 30 that forwards network traffic in accordance with forwarding information 36.

Control plane 32A may further comprise a user interface module 38, a chassis management module 39 and a maintenance endpoint (MEP) 40A ("MEP 40A"). User interface module 38 ("UI module 38") may represent a hardware or a combination of hardware and software of control unit 30 by which an administrator 42 ("admin 42") or some other user interacts with control unit 30. Chassis management module 39 represents hardware or a combination of hardware and software included within control unit 30 that manages internal operation of bridge 28. Chassis management module 39 may perform ISSU events and other planned events. In some instances, chassis management module 39 may coordinate execution of an ISSU event for example to upgrade various IFCs 48 and modules of control unit 30 in a ordered fashion such that the ISSU event can be completed in an efficient and orderly manner. MEP 40A may represent a hardware or a combination of hardware and software of control unit 30 that manages distributed MEP 40B ("MEP 40B"), where MEP 40B is executed or otherwise reside within one of interface cards (IFCs) 48A-48N ("IFCs 48"), i.e., IFC 48A in the example of FIG. 2. MEPs 40A, 40B ("MEP 40") may represent a single distributed MEP instance, where MEP 40A controls MEP 40B and MEP 40B implements CCM and other message servicing operations at IFC 48A to more efficiently service these messages.

MEP 40A manages the configuration and maintenance of MEP 40B and represents a single point of management for distributed MEP 40B. MEP 40A includes a continuity check protocol (CCP) module 44A ("CCP 44A") and a loopback protocol (LBP) module 44B ("LBP 44B") to facilitate maintenance of the connectivity between various networks, such as customer networks 14. Although not shown in the example of FIG. 2 for ease of illustration purposes, MEP 40B may include substantially similar CCP and LBP modules as those described above with respect to MEP 40A. MEP 40A and distributed MEP 40B may collectively represent one of MEPs 24 described above with respect to the example of FIG. 1.

Router 28 also includes IFCs 48, as noted above, that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 30 via a respective one of paths 54A-54N ("paths 54"). Router 28 may include a chassis (not shown in FIG. 2) having a number of slots for receiving a set of cards, including IFCs 48. Each card may be inserted into a corresponding slot of a chassis for communicably coupling the card to a control unit 30 via a bus, backplane, or other electrical communication mechanism.

Moreover, IFCs 48A includes a separate or local instance of MEP 40A in the form of distributed MEPs 40B. MEP 40B is generally located locally within IFC 48A to facilitate response times to CCMs. Rather than receive and forward CCMs to control unit 30 for processing by MEP 40A, IFC 48A invokes its respective local instance of MEP 40B to process CCMs received by IFC 48A. Consequently, IFC 48A may avoid delay associated with forwarding CCMs to and receiving CCMs from control unit 30 by executing or otherwise implementing local instances of MEP 40A in the form of distributed MEP 40B. While not shown the example of FIG. 2 for ease of illustration purposes, control unit 30 may include additional modules similar to MEP 40A that individually control other modules similar to distributed MEP 40B.

Initially, admin 42 may, after powering-up, activating or otherwise enabling bridge 28 to operate within a network, interact with control unit 30 via UI module 38 to configure MEP 40A, which then configures MEP 40B in accordance with portions of the configuration information relevant to MEP 40B. Admin 42 may input configuration information that include the various parameters and information described above to establish, initiate, or otherwise enable MEP 40 to operate within a given MA. It is assumed for purposes of illustration that bridge 28 represents, in more detail, CB 18A of FIG. 1 and that admin 42 configures MEP 40, which may collectively represent MEP 24A, to operate within the MA defined by MEPs 24. Thus, admin 42 may input configuration information 48 via a maintenance session of UI module 38 to configure MEP 40A in this manner.

Once configured, bridge 28 may receive network traffic via inbound network links 50. This network traffic may originate from any one of a plurality of customer networks connected to one another via one of the above described services, such as VPLS. Assuming bridge 28 represents CB 18A of FIG. 1 in more detail for purposes of illustration, bridge 28 may receive network traffic from customer network 14A that is destined for either of customer networks 14B, 14C or receive network traffic from customer networks 14B, 14C destined for customer network 14A. IFCs 48 may, upon receiving this network traffic, forward the network traffic to data plane 32B via a respective one of paths 54.

A portion of the received network traffic may however originate not from customer devices within one of customer networks 14, but from one of CBs 18. This portion of the traffic may be referred to herein as "maintenance traffic." The maintenance traffic may include the above described Continuity Check Messages (CCMs). Upon receiving these CCMs, distributed MEP 40B may processes the CCMs by invoking CCP 44A to process the CCMs in accordance with the continuity check protocol. These CCPs 44A maintain an aging or timeout table or any other data structure by which to note receipt of CCMs from particular other MEPs, such as MEPs 24B, 24C.

In other words, respective CCPs 44A may determine, based on receipt of the CCMs, those of MEPs 24B, 24C to which MEP 40A connects. Respective CCPs 44A may then compare this list, table or other data structure of connected MEPs to a list, table or other data structure of expected MEPs. This list of expected MEPs may represent those MEPs configured within the same MA as MEP 40. In this respect, the above noted configuration information may include the list, table or other data structure of expected MEPs, and admin 42 may define this list when configuring MEP 40. CCPs 44A may compare their respective versions of the list of connected MEPs configured within CCPs 44A of MEP 40B by MEP 40A to the list of expected MEPs to determine which MEPs are not currently connected to MEP 40.

If one or more of the expected MEPs are not listed in the respective list of connected MEPs, e.g., MEP 24B, the respective one of CCPs 44A of MEP 40B may present an error, a warning, or some other alert to MEP 40A, which forwards this error, warning or alert to admin 42 via UI module 38. Typically, CCP 44A of MEP 40A interacts with UI module 38 in order to cause UI module 38 to present the alert via a user interface, such as the above noted maintenance session. The warning may indicate that an expected one of the MEPs configured to the same MA as MEP 40A has lost connectivity or is no longer connected to MEP 40A, e.g., a so-called "connectivity fault."

In response to this connectivity fault, admin 42 typically initiates a maintenance session or utilizes the currently executing maintenance session in order to resolve the location or origin of the connectivity fault. Generally, admin 42 interacts with this maintenance session to configure LBP 44B so as to locate the fault. In some instances, admin 42 interacts with LBP 44B to construct a first LBM according to user- or admin-specified parameters. At this time, LBP 44B forwards the LBM to data plane 32B, which outputs the first LBM via one of IFCs 48 and a respective one of outbound links 52 in an attempt to locate the fault.

While admin 42 may generally address connectivity faults in the manner described above, admin 42 is often also responsible for performing planned events, such as an ISSU event, with respect to devices under the management of admin 42, such as bridge 28. In the case of an ISSU event, admin 42 may upgrade software executing within IFCs 48 and/or control unit 30. In some instances, these software upgrades require that one or more of IFCs 48 be temporarily powered down and then powered up again, which is often referred to as a restart. In other instances, these software upgrades disrupt functionality of control unit 30, which impacts MEP 40A and in turn MEP 40B. In any event, the ISSU event may generally disrupt MEP 40 such that MEP 40B may not transmit one or more CCMs before a corresponding adjacency timer expires, thereby causing adjacent CBs 18B, 18C to detect a connectivity fault.

In accordance with the techniques described in this disclosure, admin 32 interfaces with control unit 30 via one or more user interfaces presented by UI module 38 to perform a planned event, which for purposes of example is assumed to be an ISSU event. To implement the ISSU event, admin 42 may interact with the one or more user interfaces presented by UI module 38 to upload or otherwise initiate a software upgrade. In response to initiating the ISSU event, UI module 38 interfaces chassis management module 39 that the ISSU event has been initiated. In response to initiating the ISSU event, chassis management module 39 enters a preparation phase of performing the ISSU event. As a part of this preparation phase, chassis management module 39 interfaces with MEP 40A to indicate to MEP 40A that an ISSU event has been initiated. MEP 40A then communicates with MEP 40B to instruct MEP 40B to generate their next CCM to include the above described optional field that instructs adjacent CBs 18B, 18C to set a loss threshold value to a sufficiently large value, such as a projected time to perform the ISSU event, so that CBs 18B, 18C avoid detecting the ISSU event as a connectivity fault. MEP 40B then forward these CCMs and report back to MEP 40A that notice of the ISSU event has been effectively communicated to CBs 18B, 18C.

Upon receiving this report or acknowledgement, MEP 40A interfaces with chassis management module 39 to inform chassis management module 39 that notice has been given, which prompts chassis management module 39 to continue with the preparation phase or otherwise continue to perform the ISSU event. Chassis management module 39 then performs the ISSU event, which generally disrupts operation of MEP 40A and/or MEP 40B. Upon completing this ISSU event, chassis management module 39 interfaces with MEP 40A to inform MEP 40A that the ISSU event has been completed. MEP 40A then interfaces with MEP 40B to instruct MEP 40B to generate CCMs such that these CCMs do not include the optional field. MEP 40B sends these CCMs to CBs 18B, 18C, effectively signaling that the ISSU event has been completed. In this manner, the techniques may enable bridge 28 to perform a planned event without triggering false positive connectivity faults.

MEP 40B may also receive CCMs with this optional field, whereupon MEP 40B may, as described below in more detail, update a loss threshold value for one or more adjacency timers maintained by those of MEPs 40B that receive these CCMs. MEP 40B generally resets the timer to the larger loss threshold value. Resetting the timers to this larger value provides either one of adjacent CBs 18B, 18C that sent the CCM with the optional field with enough time to perform their planned events. Generally, MEP 40B receives a subsequent CCM that does not include the optional field from either one of adjacent CBs 18B, 18C before the timer expires, whereupon MEP 40B updates the loss threshold value to it default or original value and reset the timer to this original value. If the timer expires before this subsequent CCM is received, MEP 40B may detect the expiration as a fault and respond in the manner described above. Alternatively, MEP 40B may receive another CCM that includes the optional field, whereupon MEP 40B resets the timer with the longer loss threshold value specified in the optional field.

In some instances, rather than utilize a separate optional field to signal a change in the loss threshold value, CBs 18 and PBs 16 may, as mentioned above, utilize a flag bit in a header of the outgoing maintenance messages, such as the CCMs. That is, MEP 40A of bridge 28, which in this instance represents CB 18A, may update a CCM template defined within CCP 44A to set a flag bit in a header of the CCM template and install this template in MEP 40B. MEP 40B then generate a new CCM in accordance with the updated template such that the new CCM has the flag bit set to indicate that bridge 28 is about to undergo a planned event. After undergoing the planned event, MEP 40A updates the CCM template again to unset or otherwise remove the flag bit and installs this CCM template in MEP 40B. MEP 40B then generate and output CCMs in accordance with this updated template such that the CCMs no longer signal the planned event.

While described above with respect to CB 18A, bridge 28 may perform a substantially similar process when assumed to represent one of PBs 16. For example, bridge 28 may receive a CCM at a point in time prior to bridge 28 performing a planned event. Chassis management module 39 interfaces with MEP 40A to inform MEP 40A that it has entered a preparation phase and will soon perform a planned event. MEP 40A then updates a CCM template defined within CCP 44A to set the planned event flag bit and installs this updated template in MEP 40B. Upon receiving the above noted CCM, MEP 40B compares the received CCM to the template and update the CCM to correspond to the template if they received CCM does not match the template. In this case, the received CCM is assumed to not have the planned event flag bit set, in which case MEP 40B detects the difference and set this bit. MEP 40B forwards this CCM to its intended destination thereby informing one or more of CBs 18 and/or PBs 16 that this adjacency is about to undergo a planned event. Router 28 then performs the planned event, and once complete, MEP 40A updates the CCM template to unset this planned event flag bit and installs the template in MEP 40B, whereupon MEP 40B begin forwarding received CCMs without setting the planned event flag bit. In this manner, an intermediate network device, such as one of PBs 16 may implement the techniques of this disclosure to signal planned events and thereby improve the accuracy with which network devices detect connectivity faults.

Figure 3:
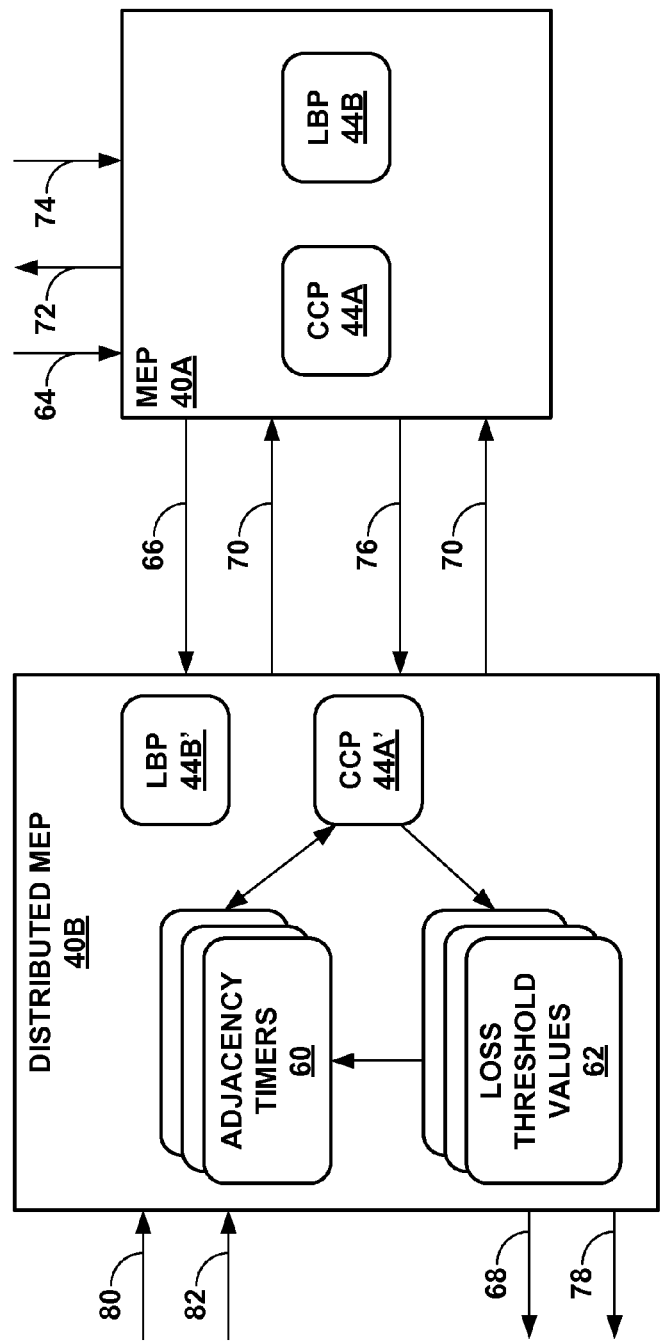
FIG. 3 is a block diagram illustrating the distributed maintenance endpoint and maintenance endpoint of FIG. 2 in more detail.

FIG. 3 is a block diagram illustrating distributed maintenance endpoint (MEP) 40B and MEP 40A of FIG. 2 in more detail. As shown in the example of FIG. 3, distributed MEP 40B includes CCP 44A' and LBP 44B' that are substantially similar to CCP 44A and LBP 44B included within MEP 40A, which was noted above with respect to the example of FIG. 2 For purposes of distinguishing CCP 44A and LBP 44B of distributed MEP 40B from CCP 44A and LBP 44B of MEP 40A, CCP 44A and LBP 44B are denoted with a prime (') in the example of FIG. 3. This notation is not intended to suggest any substantial difference between these CCP and LBP, but only to facilitate reference to each without confusion for purposes of illustration. Distributed MEP 40B also includes adjacency timers 60 that represent either hardware or a combination of hardware and software of IFCs 48A that enable an accurate account of time intervals. Generally, CCP 44A' configures adjacency timers 60 with a respective one of loss threshold values 62. In some instances, CCP 44A' configures more than one adjacency timer 60 with a single one of loss threshold values 62. Regardless, loss threshold values 62 are generally small values that denote millisecond time intervals, such as a value of 20 to denote 20 milliseconds.

At some point, MEP 40A receives a message 64 from chassis management module 39 indicating that chassis management module 39 is about to perform a planned event, such as an ISSU event. Chassis management module 39 may receive this data directly from admin 42 via UI module 38 as described above. While described as receiving this planned event initiation from UI module 38, the initiation of the planned event may originate from any module included within bridge 28 that is capable of initiating a planned event. For example, control unit 30, while not shown in the example of FIG. 2, may include a automated upgrade module that often routinely or periodically downloads software upgrades and performs these upgrades at scheduled times (such as during low network traffic times) via chassis management module 39. In any event, MEP 40A receives message 64 from chassis management module 39, which may have learned of this planned event from any one of the above noted sources, and in response to message 64, issues a configuration message 66 to distributed MEP 40B that indicates a planned event is about to occur and specifies a temporary loss threshold value that is generally substantially larger than loss threshold values 62 so as to permit performance of the planned event without triggering the planned event to be detected as a connectivity fault. MEP 40A may, in some instances, communicate a CCM template with certain values pre-populated in the optional field.

CCP 44A' receives this message 66 and generates a CCM 68 in accordance with the received CCM template that includes the optional field described below in more detail. In some instances, the CCM template was updated to set a planned event flag bit rather than or in conjunction with the optional field. This bit as described above may signal the planned event with respect to an adjacency, as an intermediate or endpoint network device may set this bit. In any event, CCP 44A' then forwards CCM 68 to one or more of adjacent CBs 18B, 18C. Upon sending CCM 68, CCP 44A' generates and outputs an acknowledgement message 70 to MEP 40A. In response to message 70, MEP 40A communicates with the originator of message 64 via a message 72 to inform chassis management module 39 that measures have been taken to avoid detection of the planned event as a connectivity fault.

Chassis management module 39, in response to message 72, then performs the planned event. After performing the planned event, chassis management module 39 issues message 74 to MEP 40A indicating that the planned event has been performed. MEP 40A then generates and outputs an event complete message 76 to distributed MEP 40B indicating that the event is complete and that the loss threshold value should be reset to its original value. Again, MEP 40A may include in this message 76 a CCM template that does not include this optional value and/or that does not have the planned event flag bit set in the manner described above, which MEP 40B uses to generate subsequent CCM 78. CCP 44A' receives message 76 and, in response to message 76, generates and forwards a CCM 78 that does not include the optional field and/or have the planned event flag bit set in accordance with the CCM template, effectively signaling that the planned event has been completed. CCM 68 and 78 may both represent a different example of an outgoing maintenance message.

CCP 44A' may also receive an incoming maintenance message in the form of CCM 80 that includes the optional field specifying a longer loss threshold value or that has the planned event flag bit set in a header of this message 80. CCP 44A' parses the header of CCM 80 to determine an adjacency to which CCM 80 corresponds. CCP 44A' then parses CCM 80 to extract the longer loss threshold value or determine that the planned event flag bit is set and updates the corresponding one of loss threshold values 62 to this longer loss threshold value or suspends this one of loss threshold values 62, respectively. Assuming CCM 80 includes the optional field specifying a longer loss threshold value, CCP 44A' then resets the corresponding one of adjacency timers 60 with the updated one of loss threshold values 62. Generally, the longer value provides adequate time to perform a planned event and at some later point in time before this one of timers 60 expires, CCP 44A' receives another subsequent CCM 82 that does not include this optional field. CCP 44A' then resets the updated one of loss threshold values 62 to its original value. In this respect, the techniques may automatically adjust adjacency timers 60 so as to avoid detecting planned events as connectivity faults.

Figure 4:
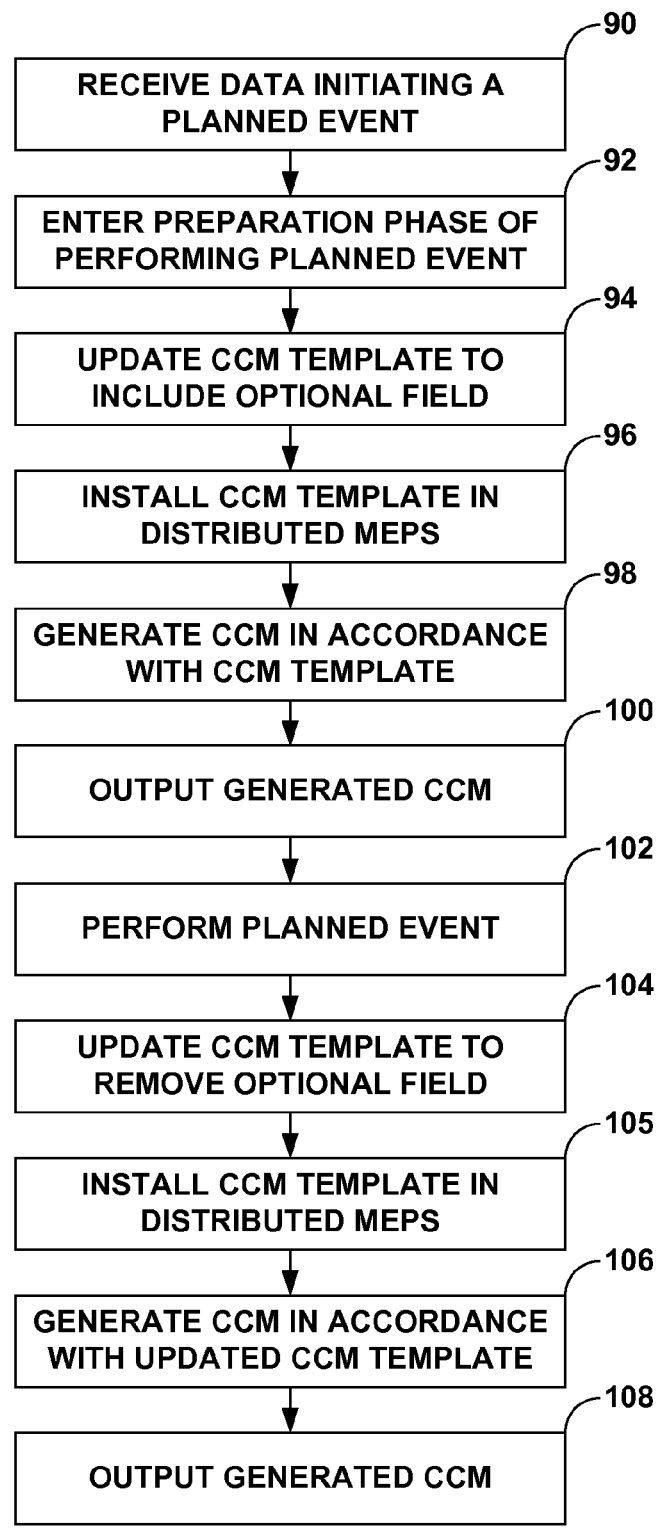
FIG. 4 is a flowchart illustrating exemplary operation of a network device in implementing the techniques described in this disclosure.

FIG. 4 is a flowchart illustrating exemplary operation of a network device, such as bridge 28 shown in the example of FIG. 2, in implementing the techniques described in this disclosure. While described below with respect to an optional field, the techniques may signal the planned event in any number of ways, including the alternative planned event flag bit described above. The techniques therefore should not be limited to the example set forth with respect to FIG. 4 but may include any common way to signal a planned event via a message.

Initially, chassis management module 39 receives data initiating a planned event, such as an ISSU event (90), in the manner described above. Chassis management module 39, in response to receiving this data initiating a planned event, enters a preparation phase prior to performing the planned event (92). During this preparation phase, chassis management module 39 interfaces with MEP 40A to indicate that chassis management module 39 will perform a planned event. MEP 40A then updates its CCM template to include the above described optional field that that instructs adjacent devices to set a loss threshold value to a sufficiently large value so that the adjacent device avoids detecting the planned event as a connectivity fault (94). MEP 40A then installs this updated CCM template in distributed MEP 40B, as described above (96).

Once installed, the one or more distributed MEP 40B generates CCMs in accordance with the updated CCM template and output these generated CCMs to one or more adjacent network devices, i.e., CBs 18B, 18C in this example (98, 100). MEP 40B acknowledges that this updated CCMs have been sent to MEP 40A, which in turn advises chassis management module 39 that is has prepared for the planned event. Chassis management module 39 then performs the planned event (102). After the planned event has been performed, chassis management module 39 interfaces with MEP 40A to inform MEP 40A that the planned event has been performed, at which point, MEP 40A updates the CCM template to remove the optional field, again as described above (104). MEP 40A then installs this updated CCM template in distributed MEP 40B (105). MEP 40B then generate CCMs in accordance with the updated template, as described above (106). MEP 40B forward these CCMs in the manner described above (108).

Figure 5:
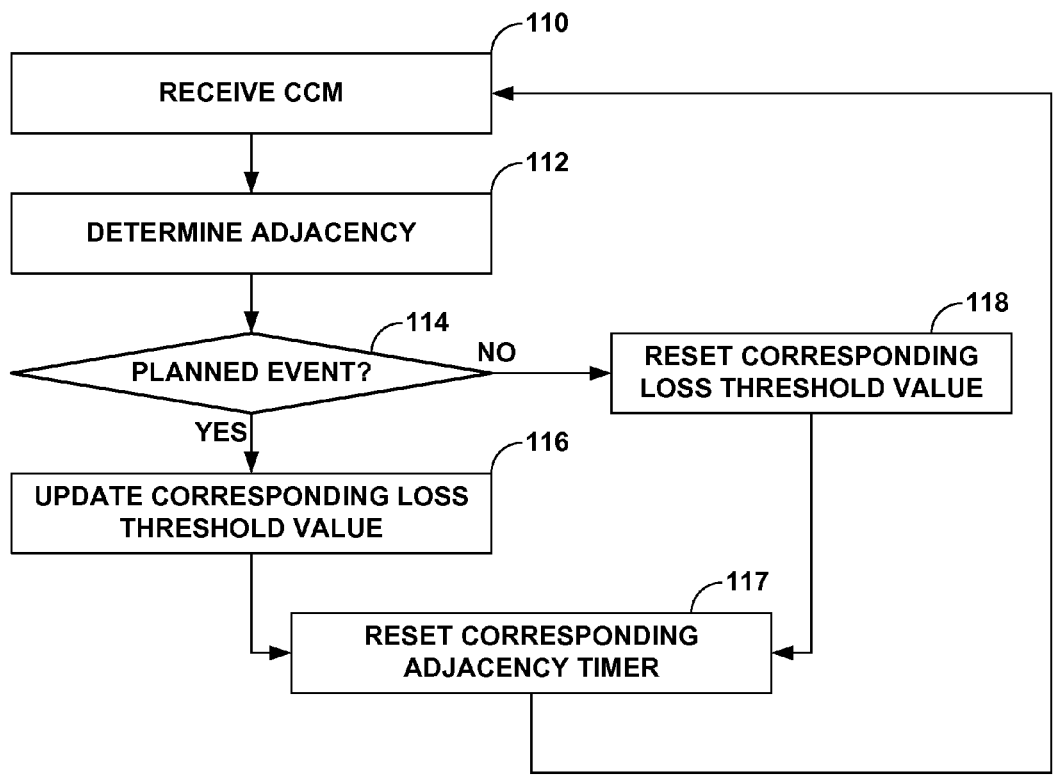
FIG. 5 is a flowchart illustrating an exemplary operation of a network device in implementing the techniques described in this disclosure to temporarily avoid detecting connectivity faults while another network device performs a planned event.

FIG. 5 is a flowchart illustrating an exemplary operation of a network device, such as bridge 28 of FIG. 3, in implementing the techniques described in this disclosure to temporarily avoid detecting connectivity faults while another network device performs a planned event. Initially, one of IFCs 48 receives a CCM (110). The CCM is forwarded to MEP 40B, which proceeds to determine an adjacency to which the received CCM corresponds (112). MEP 40B proceeds to parse this received CCM to determine whether this CCM signals that the originator of this CCM is about to perform a planned event (114).

In one example, MEP 40B parses a header of the received CCM to determine whether the planned events flag bit stored to the header of the received CCM is set. If set ("YES" 114), MEP 40B updates one of loss threshold values, such as a corresponding one of loss threshold values 61 shown in the example of FIG. 3, corresponding to the identified adjacency to temporarily suspend detection of connectivity faults for the identified adjacency (116). In some instances, MEP 40B updates the corresponding one of loss threshold values 61 to a very large value to effectively suspend detection of connectivity faults for this adjacency.

In another example, MEP 40B parses the received CCM to determine whether the CCM includes an optional planned event field that stores or otherwise defines a typically larger loss threshold value. If this CCM includes the optional planned event field signaling a planned event ("YES" 114), MEP 40B parses the CCM to extract the typically larger loss threshold value and updates the corresponding one of loss threshold values 61 with the typically larger loss threshold value specified in the optional field of the CCM (116). In any event, MEP 40B resets the one of adjacency timers 60 that corresponds to the identified adjacency with the corresponding one of loss threshold values 61 (117).

After resetting the corresponding one of adjacency timers 60, MEP 40B receives an additional CCM and determines or otherwise identifies the adjacency to which this additional CCM corresponds (110, 112). Assuming this additional CCM corresponds to the adjacency previously discussed above, MEP 40B determines whether this one of CCMs signals a planned event (114). Assuming further that the planned event flag bit is not set and/or that the CCM does not include the optional planned event field, MEP 40B determines that no planned event is signaled ("NO" 114). In this respect, the additional CCM effectively indicates that the planned event has completed. MEP 40B then resets the corresponding one of loss threshold values 61 to a default or pre-configured value (118). MEP 40B then resets the corresponding one of adjacency timers 60 with value specified by the corresponding one of loss threshold values 61 that was reset, effectively resuming connectivity fault detection with respect to the identified adjacency (117).

Figure 6:
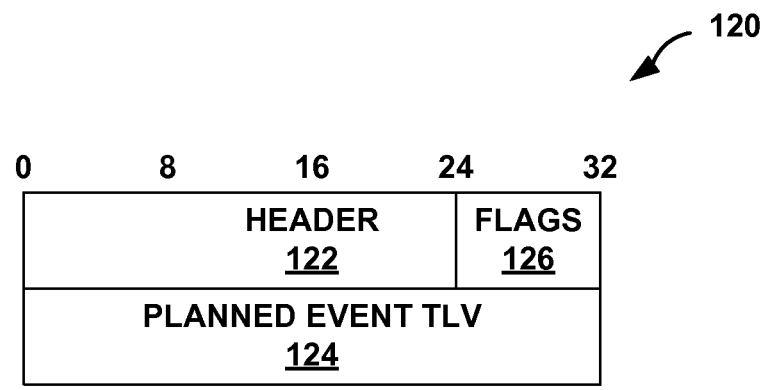
FIG. 6 is a block diagram illustrating an exemplary format of a maintenance message.

FIG. 6 is a block diagram illustrating an exemplary format of a maintenance message 120. Maintenance message 120 may represent any one of the CCMs described above. As shown in the example of FIG. 6, maintenance message 120 includes a header field 122 ("header 122") and a planned event type-length-value (TLV) field 124 ("planned event TLV 124"). Each of fields 122 and 124 may comprise a 4 octet bit field, as shown in the example of FIG. 6 by the numerals "8," "16," "24," and "32" at the top of maintenance message 120 considering that each octet represents 8 bits. Header field 122 may be commonly known as a "common Connectivity Fault Management header" or "common CFM header" when referenced by the above incorporated IEEE 802.1g standard. Header field 122 may include and define a number of parameters, including a Maintenance Domain (MD) level, a version, an OpCode, a first TLV offset, additional OpCode related information and an end TLV indication. As shown in the example of FIG. 6, header field 122 also includes flags field 126. Flags field 126, in some instances, stores a planned event flag bit for signaling performance of an upcoming planned event that may disrupt connectivity for one or more adjacencies. Planned event TLV field 124 represents an optional field that stores a loss threshold value or, more generally, an interval required to perform a planned event in accordance with the techniques described in this disclosure. While shown as consuming a certain amount of storage space, flags 126 and planned event TLV 124 may be any length suitable to accommodate the signaling techniques described in this disclosure.

Figure 7:
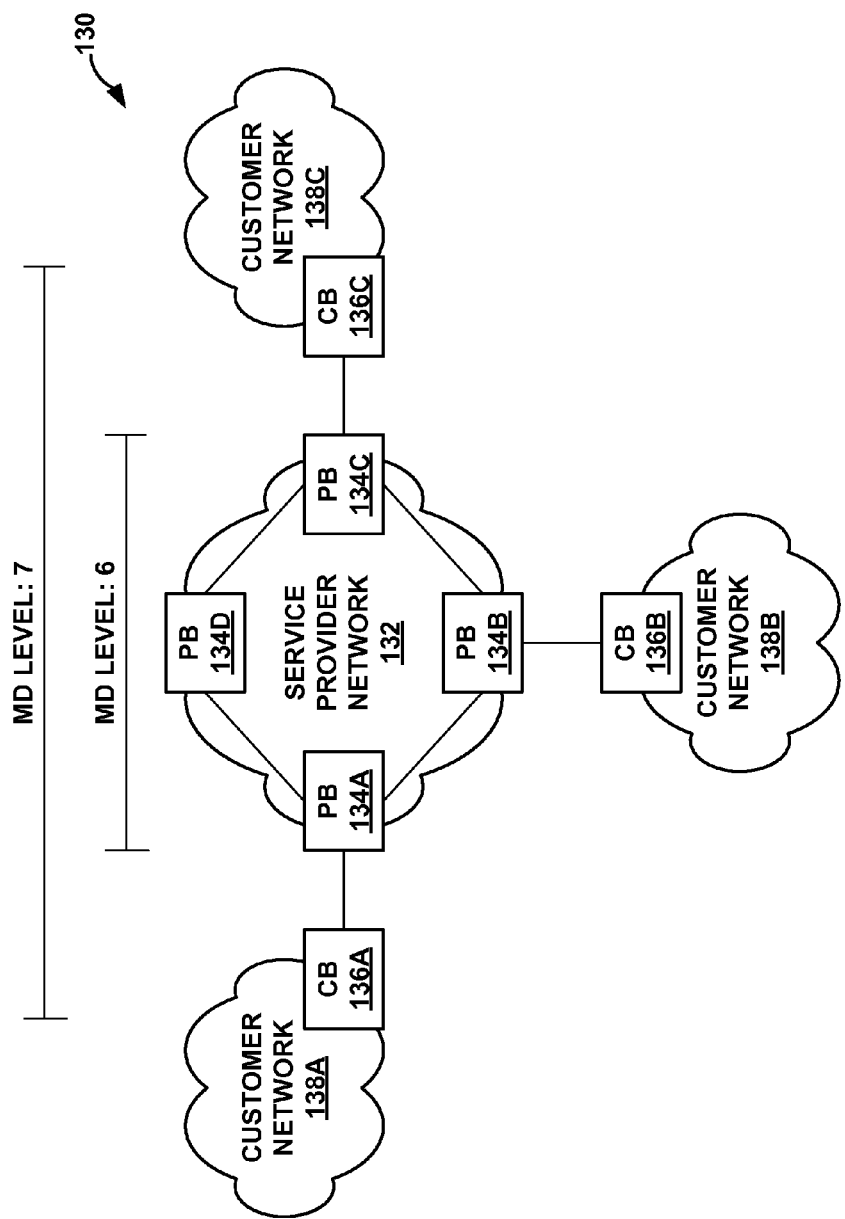
FIG. 7 is a block diagram illustrating another exemplary network system that implements the planned event signaling techniques described in this disclosure.

FIG. 7 is a block diagram illustrating another exemplary network system 130 that may implement the planned event signaling techniques described in this disclosure. Network system 130 includes a service provider network 132 that may be substantially similar to service provider network 12 shown in the example of FIG. 1, customer networks 138A-138C ("customer networks 138") that may be substantially similar to customer networks 14, PBs 134A-134D ("PBs 134") that may be substantially similar to PBs 16, CBs 136A-136C ("CBs 136") that may be substantially similar to CBs 18.

In some instances, PBs 134 and CBs 136 execute a version of a protocol referred to as a spanning tree protocol (STP) to prevent loops. Assuming that PBs 134 and 136 execute STP, it is further assumed that this protocol causes PBs 134 and CBs 136 to block the link between PB 134B and 134C and, moreover, that a flood domain has been further configured between CBs 136 so that traffic sent by one of CBs 136 is flooded to the remaining ones of CBs 136. It is also assumed that PB 134A executes a CFM MEP that multicasts CCM packets to PB 134D and 134B. Furthermore, it is assumed that PB 134B is about to undergo a planned event, such as an ISSU event, that may disrupt connectivity.

Under these assumptions, PB 134B may send a CCM in accordance with the techniques of this disclosure such that this CCM signals the upcoming planned event. PB 134A receives this CCM and implements the techniques described above to avoid detecting this signaled planned event as a connectivity fault in the manner described above. PB 134A also forwards this CCM to PB 134D, which also implements the techniques described above to avoid detecting this signaled planned event as a connectivity fault with respect to the remote adjacency. While PB 134D updates a corresponding loss threshold value so that its corresponding timers to not detect faults between PB 134A and 134B, PB 134D does not typically update its loss threshold value with respect the adjacency between PB 134A and 134D.

As further shown in the example of FIG. 7, it is further assumed that PBs 134 are configured to be in a separate maintenance domain (MD) from that CBs 136 are configured to reside within. Consequently, as explained above, CBs 136 are configured to be members of a maintenance association that differs from the maintenance association of which PBs 134 are configured to be members as a result of CBs 136 and PBs 134 being configured to different MD levels. Despite these different MD levels and the result that PBs 134 are not members of the maintenance association to which CBs 136 are configured to be members, PBs 134 perform the techniques described in this disclosure to snoop CCMs having an MD level identifier identifying a MD level different from that assigned to PBs 134 and update the flag in the header to indicate that PB 134B, referring to the example above, is about to undergo or perform a planned event. In this respect, PBs 134 may update the flag regardless of the MD level indicated by a CCM so as to effectively communicate to any one of CBs 136 the occurrence of an intermediate planned event such that these CBs 136 may effectively prepare for the planned event and avoid detecting the planned event as a connectivity fault.

To illustrate with respect to the example of FIG. 7, PB 134B may receive data initiating a planned event within PB 134B. PB 134B may enter a preparation phase in the execution of the planned event, at which point PB 134B configures distributed MEPs in its forwarding or data plane, which may be substantially similar to MEP 40 shown in the example of FIG. 2, to begin snooping any CCMs. PB 134B also updates the CCM template to set the flag in the header of the CCM template, which represents an indicator that the planned event will be performed by an intermediate network device, i.e., PB 134B in this example. A module in PB 134B substantially similar to MEP 40A may perform this template update and install this template in distributed MEP 40B. PB 134B may then receive a first CCM from CB 136A via PB 134A destined for CB 136B as well as a second CCM from CB 136A via PB 134A destined for CB 136C. Both the first and second CCMs include data indicating that their respective MD level is 7, which is not the same as the MD level of 6 assigned to PB 134B. However, rather than merely forward these CCMs to their intended destination, PB 134B suspends this check during the preparation phase of performing the planned event and instead updates these CCMs in accordance with the CCM template to set the flag, thereby indicating to each of CBs 136B and 136C that PB 134B is going to perform a planned event that may disrupt connectivity.

Alternatively, PB 134B may be configured to include a MIP having the same MD level of 7 as that of CBs 136. In this instance, the MIP of PB 134B may intercept these CCMs and update in the manner described above to alert each of CBs 136B and 136C of the planned event. In this respect, PB 134B may be assigned the same MD level as that of CBs 136.

In some instances, PB 134B may update an already modified CCM, where these modification may include, for example, CB 136A modifying the CCM to include the optional planned event TLV described above. Once PB 134 modifying this CCM (which for example is destined for CB 136B), the modified CCM may include multiple indicators, one of which indicates that CB 136A will perform a planned event and the other of which indicates that PB 134B will perform an additional planned event. CB 136B, upon receiving this twice-modified CCM, may be configured to handle this event in accordance with local policies.

In some instances, CB 136B may compare the loss threshold value specified in the optional planned event TLV of the twice-modified CCM to a reserve loss threshold value configured to be used in response to detecting that the planned event flag bit in the header of the CCM is set. CB 136B may select the larger of the two loss threshold values and use this larger one of the two loss threshold values when setting the corresponding adjacency timer. In other instances, CB 136B may use the shorter of the two loss threshold values and use this shorter one of the two loss threshold values when setting this corresponding adjacency timer. In still other instances, CB 136B may not compare the two loss threshold values but instead refrain from using either of the two signaled loss threshold values.

Whether twice-modified or not, CB 136B may in other instances determine an appropriate response based on a context in which this modified CCM is received. That is, CB 136B may store data reflecting those adjacencies that are going to be impacted by a planned event. If more than a threshold number of adjacencies is going to be impacted by a planned event, CB 136B may determine not to update this threshold value in response to the modified CCM and instead detect opt to detect planned events as connectivity faults in certain contexts.

In this and many other ways, CB 136B may respond to planned events signaled via CCMs by both originating devices, such as CB 136A, and intermediate devices, such as PB 134B. While the techniques of this disclosure are described above with respect to the protocol specified in the IEEE 802.1g standard, the techniques may also be implemented with respect to the ling fault management protocol specified in IEEE 802.3ah. Consequently, the techniques should not be limited to any one protocol, but may be implemented with respect to any protocol capable of signaling a planned event.

Various embodiments of the invention have been described. These and other embodiments are within the scope of the following claims.

The invention claimed is:

1. A method comprising:
configuring a first network device to be a member of a maintenance association that is established to verify the integrity of a single service instance, the maintenance association comprising a logical grouping of at least the first network device, a second network device, and a third network device, the second network device being positioned between the first network device and the third network device, and the second network device being communicatively coupled to the first and third network devices;
outputting a first outgoing maintenance message with the first network device to each of the second and third network devices to verify connectivity;
receiving an indication to initiate a planned event with the first network device;
prior to performing the planned event within the first network device capable of disrupting the maintenance association, generating a modified outgoing maintenance message with the first network device that indicates connectivity and includes an indicator that the planned event will be performed by the first network device;
transmitting, with the first network device, the modified outgoing maintenance message to the second and third network devices to direct the second and third network devices to avoid detecting the planned event as a connectivity fault, wherein the second network device outputs a second outgoing maintenance message to the first and third network devices after receiving the modified outgoing maintenance message, and wherein the second outgoing maintenance message output by the second network device does not inform the third network device of the planned event to be performed by the first network device; and
after transmitting the modified outgoing maintenance message, performing the planned event within the first network device.

2. The method of claim 1, wherein generating the modified outgoing maintenance message includes generating the modified outgoing maintenance message such that the modified outgoing maintenance message includes an optional field that instructs the second and third network devices to set respective loss threshold values to a sufficiently large value so that the second and third network devices avoid detecting the planned event as a connectivity fault, wherein each of the respective loss threshold values indicates a period of time during which each of the second and third network devices waits to receive a successive outgoing maintenance message from the first network device before detecting a connectivity fault.

3. The method of claim 2,
wherein the first outgoing maintenance message and the modified outgoing maintenance messages each includes a layer two (L2) continuity check message (CCM) formed in accordance with a L2 continuity check protocol (CCP), and
wherein the optional field includes a type-length-value (TLV) field appended to the L2 CCM formed in accordance with the L2 CCP.

4. The method of claim 1, further comprising:
initiating an adjacency timer after receiving an incoming maintenance message from the second network device;
determining that a connectivity fault has occurred between the first network device and the second network device in response to the expiration of the adjacency timer; and
in response to determining the connectivity fault, performing connectivity fault management in an attempt to restore connectivity between the first and second network devices.

5. The method of claim 1, further comprising:
receiving, with an intermediate network device positioned between the first and second network devices, the first outgoing maintenance message prior to performing a planned event within the intermediate network device capable of disrupting the maintenance association;
updating, with the intermediate network device, the first outgoing maintenance message to indicate that the intermediate network device will perform the planned event within the intermediate network device;
forwarding, with the intermediate network device, the updated first outgoing maintenance message to the second network device to inform the second network device that the intermediate network device is going to perform the planned event.

6. The method of claim 5, wherein the planned event that will be performed by the intermediate network device includes one or more of a software upgrade and an in-service software upgrade (ISSU).

7. The method of claim 5, wherein updating the first outgoing maintenance message comprises updating a flag in a header of the first outgoing maintenance message to indicate that the intermediate network device will perform the planned event.

8. The method of claim 1, wherein the planned event includes one or more of a software upgrade and an in-service software upgrade (ISSU).

9. The method of claim 1,
wherein the first and second network devices each include a layer two (L2) network device, and
wherein the outgoing maintenance message and the modified outgoing maintenance message conform to a L2 operations, administration and management (OAM) protocol.

10. The method of claim 1, wherein the first, second, and third network devices each comprises a layer two (L2) network device.

11. A network device comprising:
a control unit that includes a maintenance endpoint (MEP) module configured to be a member of a maintenance association that is established to verify the integrity of a single service instance, wherein the maintenance association comprises a logical grouping of at least the network device, an intermediate network device, and an additional network device, the intermediate network device being positioned between the network device and the additional network device, wherein the intermediate network device communicatively couples to the network device and the additional network device; and
at least one interface including a distributed MEP module that outputs a first outgoing maintenance message to each of the intermediate network device and the additional network device, to verify connectivity between the network device and a respective one of the intermediate network device and the additional network device,
wherein the control unit receives an indication to initiate a planned event capable of disrupting the maintenance association;
wherein the distributed MEP module, prior to the control unit performing the planned event capable of disrupting the maintenance association, generates a modified outgoing maintenance message that indicates connectivity and includes an indicator that the planned event will be performed by the network device and transmits the modified outgoing maintenance message to the intermediate network device and to the additional network device, to direct the intermediate network device and the additional network device to avoid detecting the planned event as a connectivity fault,
wherein the intermediate network device outputs a second outgoing maintenance message to the network device and to the additional network device after receiving the modified outgoing maintenance message, wherein the second outgoing maintenance message output by the intermediate network device does not inform the third network device of the planned event to be performed by the first network device, and
wherein the control unit, after transmitting the modified outgoing maintenance message, performs the planned event within the network device.

12. The network device of claim 11, wherein the distributed MEP module generates the modified outgoing maintenance message such that the modified outgoing maintenance message includes an optional field that instructs the intermediate network device and the additional network device to set respective loss threshold values to sufficiently large values so that each of the intermediate network device and the additional network device avoids detecting the planned event as a connectivity fault, wherein each respective loss threshold value indicates a period of time during which the respective one of the intermediate network device and the additional network device waits to receive a successive outgoing maintenance message from the network device before detecting a connectivity fault with respect to the network device.

13. The network device of claim 11,
wherein the first outgoing maintenance message and the modified outgoing maintenance messages each includes a layer two (L2) continuity check message (CCM) formed in accordance with a L2 continuity check protocol (CCP), and
wherein the optional field includes a type-length-value (TLV) field appended to the L2 CCM formed in accordance with the L2 CCP.

14. The network device of claim 11,
wherein the distributed MEP module initiates an adjacency timer after receiving an incoming maintenance message from the intermediate network device, determines that a connectivity fault has occurred between the network device and the intermediate network device in response to the expiration of the adjacency timer, and
wherein the MEP module, in response to determining the connectivity fault, performs connectivity fault management in an attempt to restore connectivity between the network device and the intermediate network device.

15. The network device of claim 11,
wherein the network device is positioned between first and second network devices,
wherein the network device communicatively couples to each of the first and second network devices, and
wherein the distributed MEP module receives a second outgoing maintenance message prior to performing a planned event within the first network device capable of disrupting the maintenance association, updates the received first outgoing maintenance message to indicate that the first network device will perform the planned event within the first network device, and forwards the updated first outgoing maintenance message to the second network device to inform the second network device that the first network device will perform the planned event.

16. The network device of claim 15, wherein the planned event that will be performed by the first network device includes one or more of a software upgrade and an in-service software upgrade (ISSU).

17. The network device of claim 15, wherein the distributed MEP module updates a flag in a header of the outgoing maintenance message to indicate that the first network device will perform the planned event.

18. The network device of claim 11, wherein the planned event includes one or more of a software upgrade and an in-service software upgrade (ISSU).

19. The network device of claim 11,
wherein the network device, the intermediate network device, and the additional network device each include a layer two (L2) network device, and
wherein the first outgoing maintenance message and the modified outgoing maintenance message conform to a L2 operations, administration and management (OAM) protocol.

20. A non-transitory computer-readable medium comprising instructions that cause a processor to:
configure a first network device to be a member of a maintenance association, wherein the maintenance association comprises a logical grouping of at least the first network device, a second network device, and a third network device, the maintenance association being established to verify the integrity of a single service instance, wherein the second network device is positioned between the first network device and the third network device, and wherein the second network device communicatively couples to the first and third network devices;

output a first outgoing maintenance message with the first network device to each of the second and third network devices to verify connectivity between the first network device and a respective one of the second and third network devices;

receive an indication to initiate a planned event with the first network device;

prior to performing the planned event within the first network device capable of disrupting the maintenance association, generate a modified outgoing maintenance message with the first network device that indicates connectivity and includes an indicator that the planned event will be performed by the first network device;

transmit, with the first network device, the modified outgoing maintenance message to the second and third network devices to direct the second network device to avoid detecting the planned event as a connectivity fault, wherein the second network device outputs a second outgoing maintenance message to the first and third network devices after receiving the modified outgoing maintenance message, and wherein the second outgoing maintenance message output by the second network device does not inform the third network device of the planned event to be performed by the first network device; and after transmitting the modified outgoing maintenance message, perform the planned event within the first network device.

21. A method comprising:

configuring a first network device to be a member of a maintenance association that is established to verify connectivity of a single service instance, wherein the maintenance association comprises a logical grouping of at least the first network device, a second network device, and an intermediate network device positioned between the first and second network devices;

prior to the second network device performing a planned event capable of disrupting the maintenance association, receiving, with the first network device, a modified incoming maintenance message forwarded by the intermediate device from the second network device, wherein the modified incoming maintenance message indicates connectivity and includes multiple indicators, the multiple indicators including a first indicator that the planned event will be performed by the second network device and a second indicator to indicate that an additional planned event will be performed by the intermediate network device;

determining whether the planned event or the additional planned event will require more time to perform; and updating, with the first network device, a loss threshold value in response to the multiple indicators in the modified incoming maintenance message, and based at least in part on the determination of whether the planned event or the additional planned event will require more time to perform, so that the first network device avoids detecting the planned event as a connectivity fault, wherein the loss threshold value indicates a period of time during which the first network device waits to receive a successive incoming maintenance message before detecting the connectivity fault.

22. The method of claim 21, further comprising setting an adjacency timer to the updated loss threshold value, wherein the adjacency timer corresponds to an adjacency established within the maintenance association between the first and second network devices and times a maximum amount of time between successive maintenance messages that the first network device will wait to detect the connectivity fault.

23. The method of claim 21, further comprising:

receiving an incoming maintenance message that indicates connectivity;

setting an adjacency timer to the loss threshold value prior to updating the loss threshold value;

receiving an additional incoming maintenance message that also indicates connectivity prior to expiration of the adjacency timer; and resetting the adjacency timer to the loss threshold value prior to updating the loss threshold value.

24. The method of claim 21, wherein receiving an incoming maintenance message that indicates connectivity;

setting an adjacency timer to the loss threshold value prior to updating the loss threshold value; and detecting the connectivity fault upon the adjacency timer expiring.

25. The method of claim 21, wherein the first, intermediate, and second network devices each comprise a layer two (L2) network device.

26. The method of claim 21, wherein prior to the intermediate network device performing the additional planned event capable of disrupting the maintenance session, receiving an additional modified incoming maintenance message from the intermediate network device with the first network device, wherein the additional modified incoming maintenance message includes an indicator that the additional planned event will be performed by the intermediate network device; and updating, with the first network device, the loss threshold value in response to the indicator in the additional modified incoming maintenance message so that the first network device avoids detecting the additional planned event as a connectivity fault.

27. The method of claim 26, wherein the indicator that the additional planned event will be performed by the intermediate network device comprises a flag in a header of the additional modified incoming maintenance message.

28. The method of claim 21, wherein at least one of the planned event and the additional planned event includes one or more of a software upgrade and an in-service software upgrade (ISSU).

29. A network device comprising:

a control unit that includes a maintenance endpoint (MEP) module configured to be a member of a maintenance association that is established to verify connectivity of a single service instance, wherein the maintenance association comprises a logical grouping of at least the network device, an additional network device, and an intermediate device positioned between the network device and the additional network device; and at least one interface that includes a distributed MEP module that, prior to the additional network device performing a planned event capable of disrupting the maintenance session, receives a modified incoming maintenance message forwarded by the intermediate network device from the additional network device, wherein the modified incoming maintenance message indicates connectivity and includes multiple indicators, the multiple indicators including a first indicator that the planned event will be performed by the additional network device, and a second indicator that indicates that an additional planned event will be performed by the intermediate network device, wherein the MEP module of the control unit determines whether the planned event or the additional planned event will require more time to perform, and based on the determination, updates a loss threshold value in response to the multiple indicators in the modified incoming maintenance message so that the network device avoids detecting the planned event as a connectivity fault, wherein the loss threshold value indicates a period of time during which the network device waits to receive a successive incoming maintenance message before detecting the connectivity fault.

30. The network device of claim 29, wherein the distributed MEP module sets an adjacency timer to the updated loss threshold value, wherein the adjacency timer corresponds to an adjacency established within the maintenance association between the network device and at least one of the intermediate network device and the additional network device and times a maximum amount of time between successive maintenance messages that the network device will wait to detect the connectivity fault.

31. The network device of claim 29, wherein the distributed MEP receives an incoming maintenance message that indicates connectivity, sets an adjacency timer to the loss threshold value prior to updating the loss threshold value, receives an additional incoming maintenance message that also indicates connectivity prior to expiration of the adjacency timer and resets the adjacency timer to the loss threshold value prior to updating the loss threshold value.

32. The network device of claim 29, wherein the distributed MEP module receives an incoming maintenance message that indicates connectivity, sets an adjacency timer to the loss threshold value prior to updating the loss threshold value and detects the connectivity fault upon the adjacency timer expiring.

33. The network device of claim 29, wherein the network device, the intermediate network device, and the additional network device each comprises a layer two (L2) network device.

34. The network device of claim 29,
wherein the distributed MEP module, prior to the intermediate network device performing the additional planned event capable of disrupting the maintenance session, receives an additional modified incoming maintenance message from the intermediate network device with first network device, wherein the additional modified incoming maintenance message includes an indicator that the additional planned event will be performed by the intermediate network device; and wherein the MEP module updates the loss threshold value in response to the indicator in the additional modified incoming maintenance message so that the network device avoids detecting the additional planned event as a connectivity fault.

35. The network device of claim 34, wherein the indicator that the additional planned event will be performed by the intermediate network device comprises a flag in a header of the additional modified incoming maintenance message.

36. The network device of claim 29, wherein at least one of the planned event and the additional planned event includes one or more of a software upgrade and an in-service software upgrade (ISSU).

37. A non-transitory computer-readable storage medium comprising instructions that cause a processor to:

configure a first network device to be a member of a maintenance association that is established to verify connectivity of a single service instance, wherein the maintenance association comprises a logical grouping of at least the first network device, a second network device, and an intermediate network device positioned between the first and second network devices;

prior to the second network device performing a planned event capable of disrupting the maintenance association, receive, with the first network device, a modified incoming maintenance message forwarded by the intermediate device from the second network device, wherein the modified incoming maintenance message indicates connectivity and includes multiple indicators, the multiple indicators including a first indicator that the planned event will be performed by the second network device and a second indicator to indicate that an additional planned event will be performed by the intermediate network device;

determine whether the planned event or the additional planned event will require more time to perform; and update, with the first network device, a loss threshold value in response to the multiple indicators in the modified incoming maintenance message, and based at least in part on the determination of whether the planned event or the additional planned event will require more time to perform, so that the first network device avoids detecting the planned event as a connectivity fault, wherein the loss threshold value indicates a period of time during which the first network device waits to receive a successive incoming maintenance message before detecting the connectivity fault.

38. A method comprising:
receiving, with an intermediate network device positioned between first and second network devices, an outgoing maintenance message from the first network device, wherein the outgoing maintenance message is sent by the first network device to the second network device to verify connectivity of a maintenance association, wherein the maintenance association comprises a logical grouping of at least the first and second network devices that is established to verify the integrity of a single service instance, and wherein the intermediate device is assigned to one of: 1) a first maintenance level equal to that assigned to both the first and second network devices, or 2) a second maintenance level that is not equal to that assigned to either of the first or second network devices, the maintenance level assigned to the first and second network devices indicating a portion of a maintenance domain to which the maintenance association is associated;

prior to performing a planned event within the intermediate network device capable of disrupting the maintenance association, updating, with the intermediate network device, the outgoing maintenance message to indicate that the intermediate network device will perform the planned event;

forwarding, with the intermediate network device, the updated outgoing maintenance message to the second network device to inform the second network device that the intermediate network device is going to perform the planned event.

39. The method of claim 38, wherein updating the outgoing maintenance message includes updating a flag in a header of the outgoing maintenance message to indicate that the intermediate network device will perform the planned event.

40. The method of claim 38, further comprising:
receiving the updated outgoing maintenance message with the second network device;
updating a loss threshold value in response to the indicator in the updated outgoing maintenance message so that the second network device avoids detecting the additional planned event as a connectivity fault, wherein the loss threshold value indicates a period of time during which the first network device waits to receive a successive incoming maintenance message before detecting the connectivity fault;
setting an adjacency timer to the updated loss threshold value, wherein the adjacency timer corresponds to an adjacency established within the maintenance association between the first and second network devices and times a maximum amount of time between successive maintenance messages that the second network device will wait to detect the connectivity fault.

41. The method of claim 38, further comprising:
performing the planned event within the intermediate network device;
after performing the planned event, receiving an additional outgoing maintenance message from the first network device that is destined for the second network device; and
forwarding the additional outgoing maintenance message without updating the outgoing maintenance message to include the indicator so as to signal to the second network device that the intermediate network device has performed the planned event.

42. The method of claim 41, wherein the planned event includes one or more of a software upgrade and an in-service software upgrade (ISSU).

43. An intermediate network device positioned between first and second network devices, the intermediate network device comprising:
at least one interface that receives an outgoing maintenance message from the first network device, wherein the outgoing maintenance message is sent by the first network device to the second network device to verify connectivity of a maintenance association, wherein the maintenance association comprises a logical grouping of at least the first and second network devices that is established to verify the integrity of a single service instance, and wherein the intermediate device is assigned to one of: 1) a first maintenance level equal to that assigned to both the first and second network devices, or 2) a second maintenance level that is not equal to that assigned to either of the first or second network devices, the maintenance level assigned to the first and second network devices indicating a portion of a maintenance domain to which the maintenance association is associated; and
a control unit that receives data initiating a planned event capable of disrupting the maintenance association,
wherein the at least one interface, prior to the control unit performing the planned event, updating, updates the outgoing maintenance message to indicate that the intermediate network device will perform the planned event and forwards the updated outgoing maintenance message to the second network device to inform the second network device that the intermediate network device is going to perform the planned event.

44. The intermediate network device of claim 43, wherein the at least one interface updates a flag in a header of the outgoing maintenance message to indicate that the intermediate network device will perform the planned event.

45. The intermediate network device of claim 43,
wherein the control unit performs the planned event within the intermediate network device;
wherein the at least one interface, after the control unit performs the planned event, receives an additional outgoing maintenance message from the first network device that is destined for the second network device and forwards the additional outgoing maintenance message without updating the outgoing maintenance message to include the indicator so as to signal to the second network device that the intermediate network device has performed the planned event.

46. The intermediate network device of claim 43, wherein the planned event includes one or more of a software upgrade and an in-service software upgrade (ISSU).

47. A non-transitory computer-readable storage medium comprising instructions that cause a processor to:
receive, with an intermediate network device positioned between first and second network devices, an outgoing maintenance message from the first network device, wherein the outgoing maintenance message is sent by the first network device to the second network device to verify connectivity of a maintenance association, wherein the maintenance association comprises a logical grouping of at least the first and second network devices that is established to verify the integrity of a single service instance, and wherein the intermediate device is assigned to one of: 1) a first maintenance level equal to that assigned to both the first and second network devices, or 2) a second maintenance level that is not equal to that assigned to either of the first or second network devices, the maintenance level assigned to the first and second network devices indicating a portion of a maintenance domain to which the maintenance association is associated;
prior to performing a planned event within the intermediate network device capable of disrupting the maintenance association, update, with the intermediate network device, the outgoing maintenance message to indicate that the intermediate network device will perform the planned event;
forward, with the intermediate network device, the updated outgoing maintenance message to the second network device to inform the second network device that the intermediate network device is going to perform the planned event.

* * * * *